United States Patent
Yamamoto

(10) Patent No.: US 9,990,056 B2
(45) Date of Patent: *Jun. 5, 2018

(54) INPUT DEVICE AND METHOD AND PROGRAM

(71) Applicant: Sony Corporation, Tokyo (JP)

(72) Inventor: Kazuyuki Yamamoto, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 14/878,392

(22) Filed: Oct. 8, 2015

(65) Prior Publication Data

US 2016/0098102 A1    Apr. 7, 2016

Related U.S. Application Data

(63) Continuation of application No. 14/151,667, filed on Jan. 9, 2014, now abandoned, which is a continuation
(Continued)

(30) Foreign Application Priority Data

Oct. 31, 2008    (JP) ................................. 2008-280764

(51) Int. Cl.
*G05B 15/02* (2006.01)
*G06F 3/0354* (2013.01)
(Continued)

(52) U.S. Cl.
CPC ........... *G06F 3/0354* (2013.01); *G05B 15/02* (2013.01); *G06F 3/017* (2013.01); *G06F 3/038* (2013.01); *G06F 3/0346* (2013.01); *G06F 3/0383* (2013.01); *H04N 5/4403* (2013.01); *H04N 21/42222* (2013.01)

(58) Field of Classification Search
None
See application file for complete search history.

(56) References Cited

U.S. PATENT DOCUMENTS 8,413,077 B2    4/2013    Yamamoto et al.
8,648,798 B2    2/2014    Yamamoto
(Continued)

FOREIGN PATENT DOCUMENTS

JP    63-128417    6/1988
JP    10-307676    11/1998
(Continued)

*Primary Examiner* — Tony N Ngo
(74) *Attorney, Agent, or Firm* — Wolf, Greenfield & Sacks, P.C.

(57) ABSTRACT

An input device includes a detection unit, a first acquisition unit, a second acquisition unit, and a compensation unit. The detection unit is configured to detect an operation by a user for controlling an electronic device and output an operation signal corresponding to the operation. The first acquisition unit is configured to acquire the detected operation signal and a differential value of the operation signal. The second acquisition unit is configured to acquire a function defined by the differential value to compensate for a delay in response of the operation signal with respect to the operation by the user. The compensation unit is configured to compensate the operation signal with the acquired function.

7 Claims, 33 Drawing Sheets

Related U.S. Application Data of application No. 12/606,484, filed on Oct. 27, 2009, now Pat. No. 8,648,798.

(51) Int. Cl.
  *G06F 3/01* (2006.01)
  *G06F 3/0346* (2013.01)
  *G06F 3/038* (2013.01)
  *H04N 5/44* (2011.01)
  *H04N 21/422* (2011.01)

(56) References Cited

U.S. PATENT DOCUMENTS

| | | | |
|---|---|---|---|
| 8,868,798 | B1 | 10/2014 | Marshak et al. |
| 8,982,048 | B2 | 3/2015 | Kabasawa et al. |
| 9,152,246 | B2 | 10/2015 | Sawai et al. |
| 2004/0070614 | A1 | 4/2004 | Hoberock et al. |
| 2007/0005817 | A1* | 1/2007 | Kwak ............... G06F 3/03543 710/3 |
| 2007/0252813 | A1* | 11/2007 | Liberty ............... G06F 1/3215 345/156 |
| 2010/0110001 | A1 | 5/2010 | Yamamoto |
| 2010/0156786 | A1 | 6/2010 | Kabasawa et al. |
| 2010/0169824 | A1 | 7/2010 | Sawai et al. |
| 2010/0169843 | A1 | 7/2010 | Yamamoto et al. |
| 2014/0195016 | A1 | 7/2014 | Yamamoto |
| 2015/0220165 | A1 | 8/2015 | Kabasawa et al. |

FOREIGN PATENT DOCUMENTS

| | | |
|---|---|---|
| JP | 11-305895 | 11/1999 |
| JP | 2004-062656 A | 2/2004 |
| JP | 2007-034525 A | 2/2007 |
| JP | 2007-509448 A | 4/2007 |
| JP | 2007-535774 A | 12/2007 |

* cited by examiner

INPUT DEVICE AND METHOD AND PROGRAM

CROSS-REFERENCE TO RELATED APPLICATIONS

The present application claims the benefit under 35 U.S.C. § 120 as a continuation application of U.S. patent application Ser. No. 14/151,667, filed on Jan. 9, 2014, entitled "INPUT DEVICE AND METHOD AND PROGRAM", which is a continuation application of U.S. patent application Ser. No. 12/606,484, filed on Oct. 27, 2009, now U.S. Pat. No. 8,648,798, issued Feb. 11, 2014, entitled "INPUT DEVICE AND METHOD AND PROGRAM", which claims priority to Japanese Patent Application No. JP2008-280764, filed on Oct. 31, 2008, the entire contents of each of which are incorporated herein by reference.

BACKGROUND OF THE INVENTION

1. Field of the Invention

The present invention relates to an input device and method and a program, particularly to an input device and method and a program capable of improving the operational feeling in an input operation.

2. Description of the Related Art

With the recent start of terrestrial digital television broadcasting, an EPG (Electronic Program Guide) can be displayed on a television receiver. In the EPG, respective programs are arranged and displayed in a matrix. A user operates a remote controller to move a pointer to an arbitrary position and select a given program.

Generally, a remote controller supplied with a television receiver is capable of moving the pointer only in the vertical or horizontal directions. That is, the pointer is not directly moved from a given display position to an intended position located diagonally therefrom.

In view of this, a remote controller has been proposed which detects an operation performed by a user in an arbitrary direction in a three-dimensional free space and moves the pointer in the direction of the operation. According to this type of remote controller, however, the operation by the user and the actual movement of the pointer do not match in timing. As a result, the user has uncomfortable operational feeling in many cases.

Japanese Patent No. 3217945 proposes not a remote controller enabling the operation in an arbitrary direction in a three-dimensional free space, but the improvement of the operational feeling of a controller provided at the center of a keyboard of a personal computer to move the pointer in accordance with the operation of a pressure-sensitive device called an isometric joystick.

As illustrated in FIG. 1, the invention of the above patent publication realizes a transfer function capable of providing the output as indicated by the broken line with respect to the input indicated by the solid line, to thereby solve the slow motion of the pointer at the start of the movement thereof, which is caused mainly by the dead zone of the above-described device (i.e., the dead zone in which low pressure is ignored), and the overshoot occurring when the movement is stopped.

SUMMARY OF THE INVENTION

In a so-called consumer-use AV (Audio Visual) device, such as a television receiver, the clock of an MPU (Micro Processing Unit) is slower than in a personal computer or the like. As a result, in the movement of a pointer on a screen, for example, a relatively long delay occurs between the reception of a movement signal and the movement of the pointer on the screen. In this case, a user has uncomfortable feeling about the delay which occurs not only at the start or stop of the movement of the pointer but also in the acceleration or deceleration phase during the movement.

Further, in the case of using the type of remote controller which is operated in a three-dimensional free space by a user, a time delay between the operation and the output of an operation signal corresponding to the operation additionally occurs. Further, the hand operating the remote controller is freely movable. Therefore, the user more easily recognizes the delay in the movement of the pointer in response to the operation than in the case of using a joystick or the like. As a result, the unconformable feeling felt by the user is more noticeable.

According to the technique of the above patent publication, however, it is difficult in the above-described situation to promptly start the movement of the pointer, move the pointer as desired, or promptly stop the movement of the pointer without causing uncomfortable feeling to the user during the operation.

The present invention has been made in light of the above-described circumstances, and it is desirable to improve the operational feeling in an input operation. Particularly, in a system having a relatively long delay, it is desirable to improve the operational feeling in an input operation.

According to an embodiment of the present invention, an input device includes a detection unit, a first acquisition unit, a second acquisition unit, and a compensation unit. The detection unit is configured to detect an operation by a user for controlling an electronic device and output an operation signal corresponding to the operation. The first acquisition unit is configured to acquire the detected operation signal and a differential value of the operation signal. The second acquisition unit is configured to acquire a function defined by the differential value to compensate for a delay in response of the operation signal with respect to the operation by the user. The compensation unit is configured to compensate the operation signal with the acquired function.

According to an embodiment of the present invention, a detection unit detects an operation by a user for controlling an electronic device and outputs an operation signal corresponding to the operation, a first acquisition unit acquires the detected operation signal and a differential value of the operation signal, a second acquisition unit acquires a function defined by the differential value to compensate for a delay in response of the operation signal with respect to the operation by the user, and a compensation unit compensates the operation signal with the acquired function.

As described above, according to an embodiment of the present invention, the operational feeling in an input operation can be improved. Particularly, in a system having a relatively long delay, the operational feeling in an input operation can be improved.

DESCRIPTION OF THE PREFERRED EMBODIMENTS

Preferred embodiments (hereinafter referred to as embodiments) for implementing the invention will be described below. The description will be made in the following order: 1. First Embodiment (Configuration of System), 2. First Embodiment (Configuration of Input Device), 3. First Embodiment (Electrical Configuration of Input Device), 4. First Embodiment (Functional Configuration of MPU in Input Device), 5. First Embodiment (Operation of Input Device), 6. First Embodiment (Characteristics of Input Device), 7. Second Embodiment (Operation of Television Receiver), 8. Second Embodiment (Operation of Input Device), 9. Third Embodiment (Operation of Input Device), 10. Third Embodiment (Characteristics of Input Device), 11. Fourth Embodiment (Configuration of Input Device), 12. Fifth Embodiment (Configuration of Input Device), 13. Sixth Embodiment (Configuration of Input Device), 14. Seventh Embodiment (Configuration of Input System), 15. Seventh Embodiment (Functional Configuration of Image Processing Unit), 16. Seventh Embodiment (Operation of Television Receiver), 17. Eighth Embodiment (Functional Configuration of Image Processing Unit), 18. Eighth Embodiment (Operation of Television Receiver), 19. Changes in Displacement, and 20. Modified Examples.

1. First Embodiment

Figure 1:
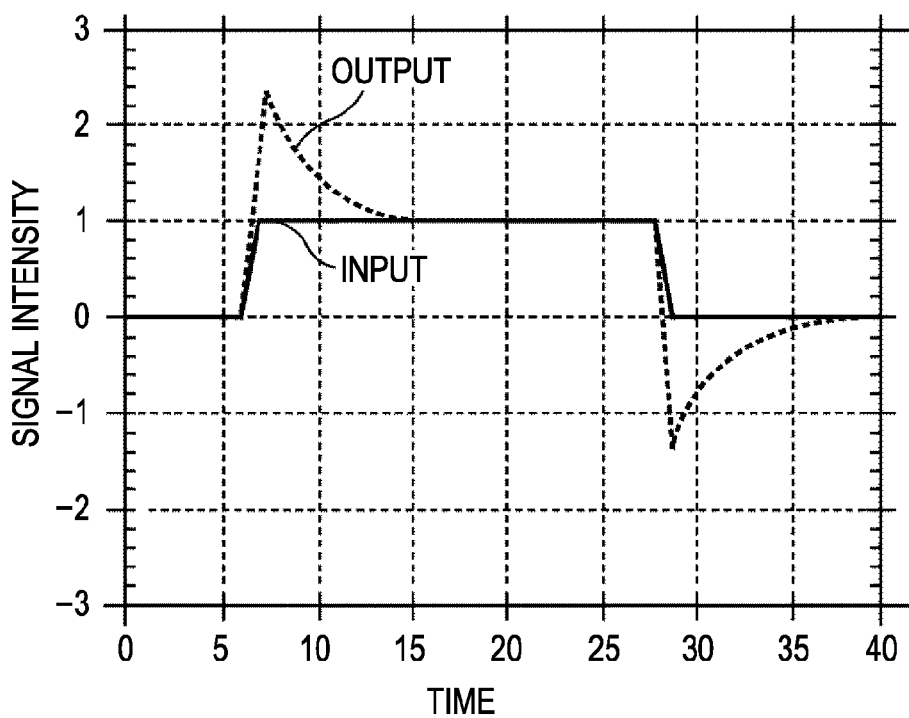
FIG. 1 is a diagram illustrating a characteristic of a transfer function of an existing input device.
Figure 2:
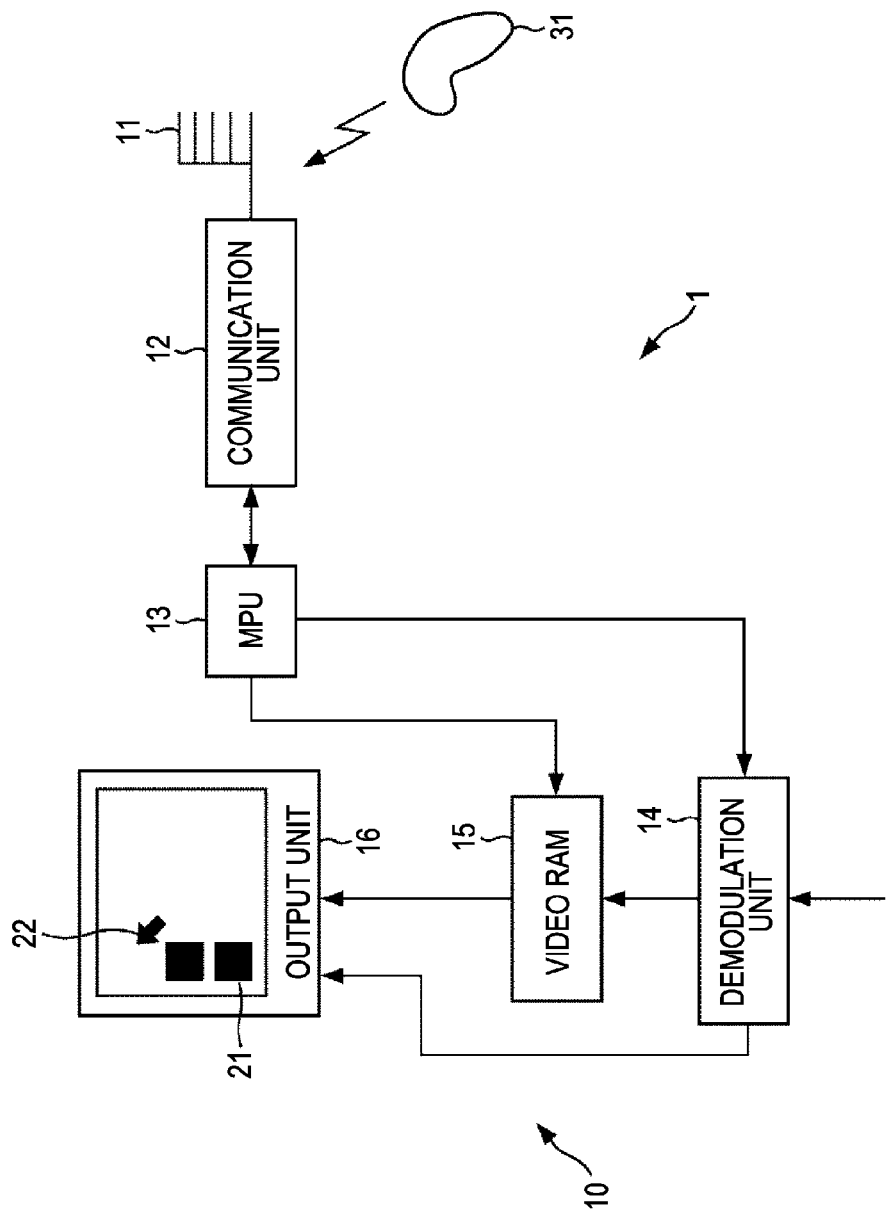
FIG. 2 is a block diagram illustrating a configuration of an input system according to an embodiment of the present invention.

Configuration of System: FIG. 2 illustrates a configuration of an input system according to an embodiment of the present invention.

This input system 1 is configured to include a television receiver 10 functioning as an electronic device and an input device 31 functioning as a pointing device or remote controller for remote-controlling the television receiver 10.

The television receiver 10 is configured to include an antenna 11, a communication unit 12, an MPU (Micro Processing Unit) 13, a demodulation unit 14, a video RAM (Random Access Memory) 15, and an output unit 16.

The antenna 11 receives radio waves from the input device 31. The communication unit 12 demodulates the radio waves received via the antenna 11, and outputs the demodulated radio waves to the MPU 13. Further, the communication unit 12 modulates a signal received from the MPU 13, and transmits the modulated signal to the input device 31 via the antenna 11. The MPU 13 controls the respective units on the basis of an instruction received from the input device 31.

The demodulation unit 14 demodulates a television broadcasting signal received via a not-illustrated antenna, and outputs a video signal and an audio signal to the video RAM 15 and the output unit 16, respectively. The video RAM 15 combines an image based on the video signal supplied from the demodulation unit 14 with an image of on-screen data such as a pointer and an icon received from the MPU 13, and outputs the combined image to an image display unit of the output unit 16. The output unit 16 displays the image on the image display unit, and outputs sound from an audio output unit formed by a speaker and so forth.

In the display example of FIG. 2, the image display unit of the output unit 16 displays an icon 21 and a pointer 22. The input device 31 is operated by a user to change the display position of the icon 21 or the pointer 22 and to remote-control the television receiver 10.

Figure 3:
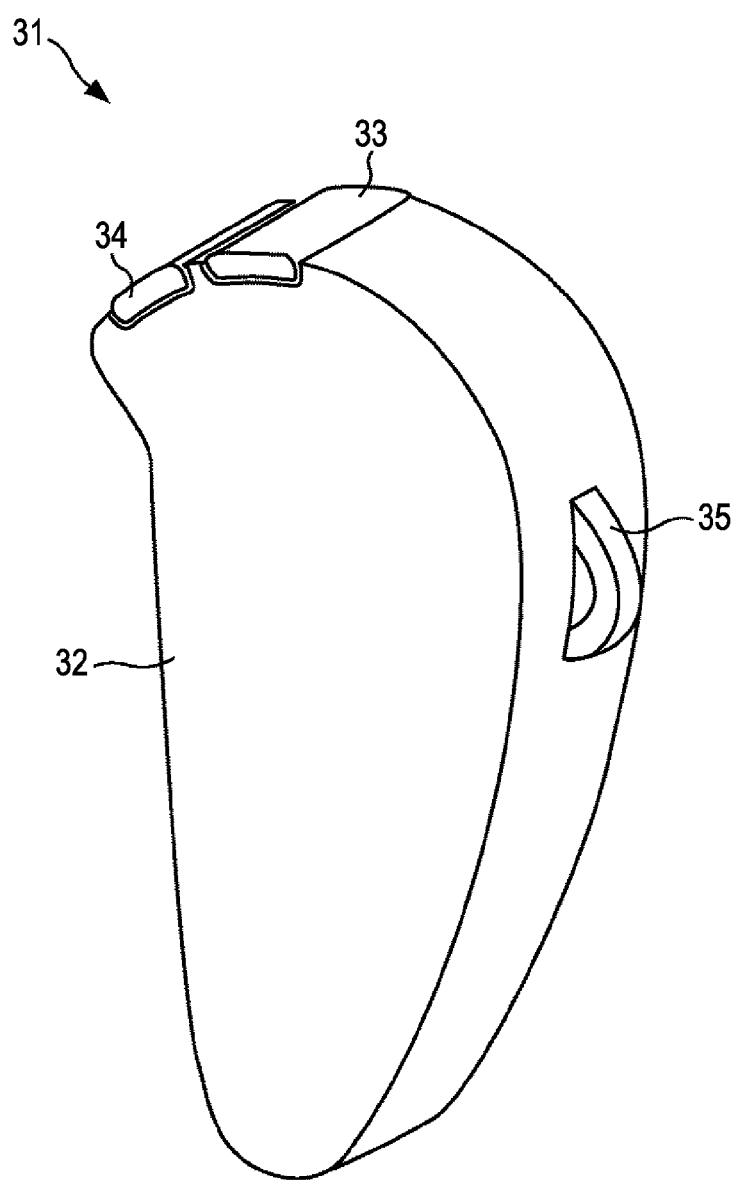
FIG. 3 is a perspective view illustrating a configuration of the exterior of an input device.

Configuration of Input Device: FIG. 3 illustrates a configuration of the exterior of the input device 31. The input device 31 includes a body 32 functioning as an operation unit operated by the user to generate an operation signal for controlling an electronic device. The body 32 is provided with buttons 33 and 34 on the upper surface thereof and a jog dial 35 on the right surface thereof.

Figure 4:
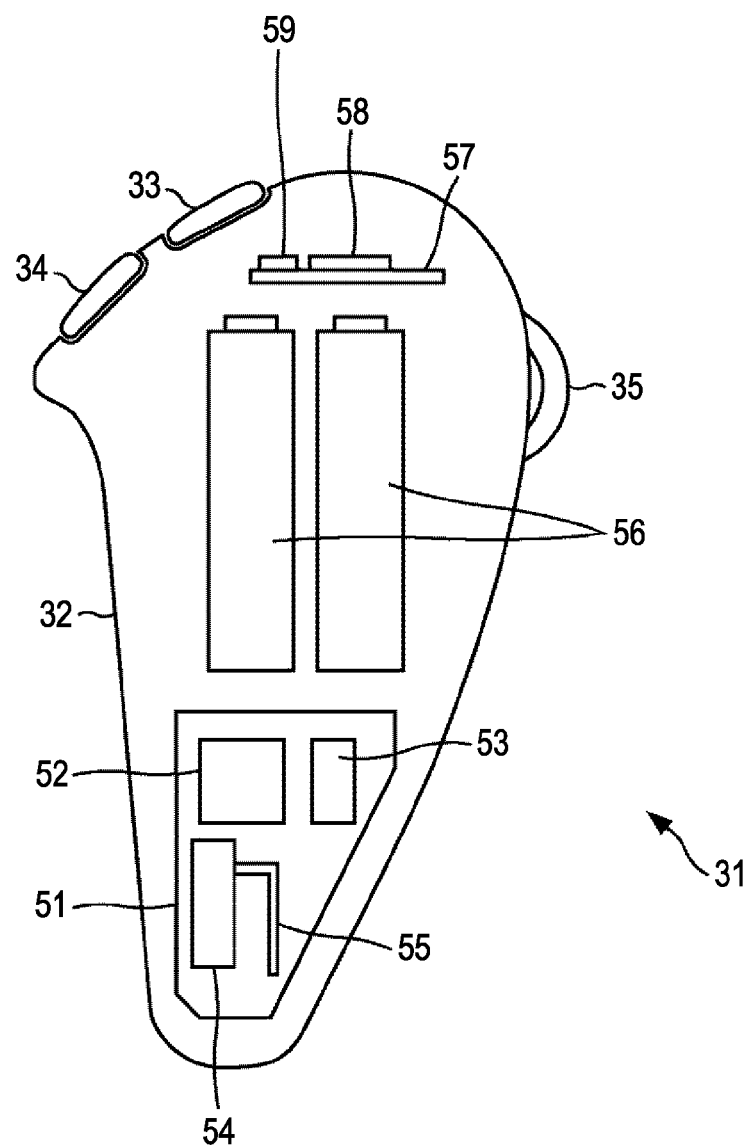
FIG. 4 is a diagram illustrating a configuration of the interior of the input device.

FIG. 4 illustrates a configuration of the interior of the body 32 of the input device 31. In the interior of the input device 31, a main substrate 51, a sensor substrate 57, and batteries 56 are stored. The main substrate 51 is attached with an MPU 52, a crystal oscillator 53, a communication unit 54, and an antenna 55.

Figure 5:
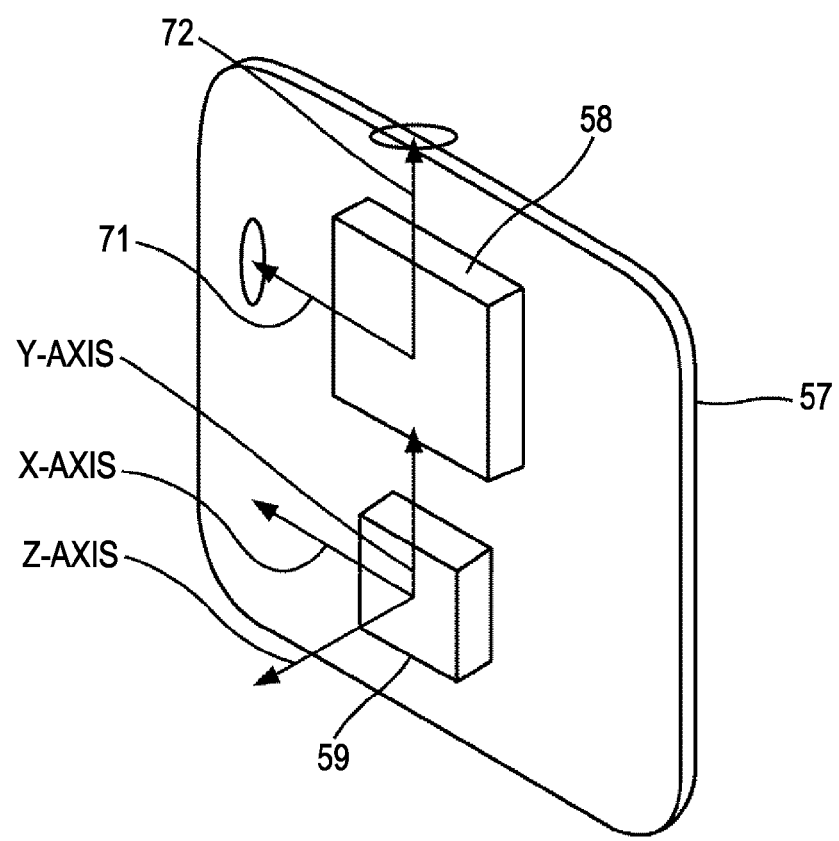
FIG. 5 is a perspective view illustrating a configuration of a sensor substrate.

As illustrated on an enlarged scale in FIG. 5, the sensor substrate 57 is attached with an angular velocity sensor 58 and an acceleration sensor 59, which are manufactured by the technique of MEMS (Micro Electro Mechanical Systems). The sensor substrate 57 is set to be parallel to the X-axis and the Y-axis, which are two mutually perpendicular sensitivity axes of the angular velocity sensor 58 and the acceleration sensor 59.

Figure 6:
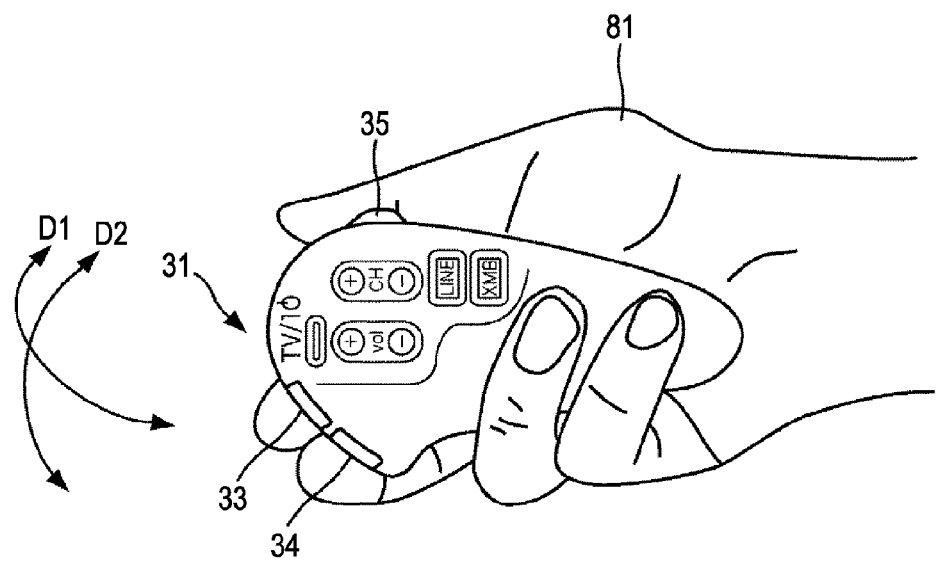
FIG. 6 is a diagram illustrating a use state of the input device.

If the entire body 32 is operated by the user in, for example, an arbitrary direction D1 or direction D2 illustrated in FIG. 6 with the head of the body 32 (an end portion in the left direction in FIG. 6 described later) directed toward the television receiver 10 typically located ahead thereof (located in the left direction, although not illustrated in FIG. 6), the angular velocity sensor 58 formed by a biaxial oscillating angular velocity sensor detects the respective angular velocities of a pitch angle and a yaw angle rotating around a pitch rotation axis 71 and a yaw rotation axis 72 parallel to the X-axis and the Y-axis, respectively. The acceleration sensor 59 is a biaxial acceleration sensor which detects the acceleration in the directions of the X-axis and the Y-axis. The acceleration sensor 59 is capable of detecting the gravitational acceleration as the vector quantity by using the sensor substrate 57 as the sensitivity plane. A triaxial acceleration sensor using three axes of the X-axis, the Y-axis, and the Z-axis as the sensitivity axes can also be used as the acceleration sensor 59.

The two batteries 56 supply necessary electric power to the respective units.

FIG. 6 illustrates a use state of the input device 31. As illustrated in the drawing, the user holds the input device 31 in his hand 81, and operates the entire input device 31 in an arbitrary direction in a three-dimensional free space. The input device 31 detects the direction of the operation, and outputs an operation signal corresponding to the direction of the operation. Further, if the button 33 or 34 or the jog dial 35 is operated, the input device 31 outputs an operation signal corresponding to the operation.

The buttons 33 and 34 correspond to the left and right buttons of a normal mouse, respectively. The button 33, the button 34, and the jog dial 35 are operated by the index finger, the middle finger, and the thumb, respectively. The commands issued when the buttons and the dial are operated are arbitrary, but may be set as follows, for example.

With a single-press of the button 33, which corresponds to a left-click, a selection operation is performed. With a press-and-hold of the button 33, which corresponds to a drag operation, an icon is moved. With a double-press of the button 33, which corresponds to a double-click, a file or folder is opened, or a program is executed. With a single-press of the button 34, which corresponds to a right-click, the menu is displayed. With rotation of the jog dial 35, a scroll operation is performed. With pressing of the jog dial 35, a confirmation operation is performed.

With the above-described settings, the user can use the input device 31 with operational feeling similar to the operational feeling which the user has when operating a normal mouse of a personal computer.

The button 33 can be configured as a two-stage switch. In this case, when the first-stage switch is operated or kept in the pressed state, an operation signal representing the movement of the input device 31 is output. Further, when the second-stage switch is operated, a selection operation is performed. It is also possible, of course, to provide a special button and output an operation signal representing the movement when the button is operated.

Figure 7:
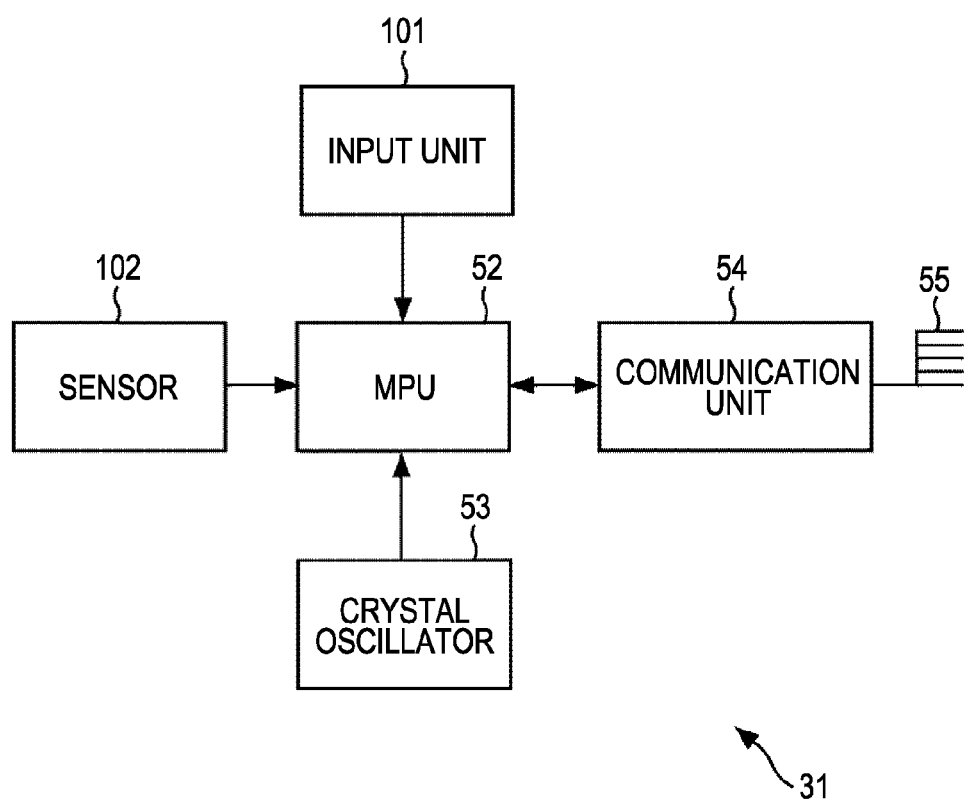
FIG. 7 is a block diagram illustrating an electrical configuration of the interior of the input device.

Electrical Configuration of Input Device: FIG. 7 illustrates an electrical configuration of the input device 31. As illustrated in the drawing, the input device 31 includes an input unit 101 and a sensor 102, in addition to the MPU 52, the crystal oscillator 53, the communication unit 54, and the antenna 55.

The crystal oscillator 53 supplies the MPU 52 with a reference clock. When the input unit 101 formed by the buttons 33 and 34, the jog dial 35, and other buttons is operated by the user, the input unit 101 outputs to the MPU 52 a signal corresponding to the operation. When the entire body 32 is operated by the user, the sensor 102 formed by the angular velocity sensor 58 and the acceleration sensor 59 detects the angular velocity and the acceleration in the operation, and outputs the detected angular velocity and acceleration to the MPU 52. The sensor 102 functions as a detection unit which detects an operation by a user for controlling an electronic device and outputs an operation signal corresponding to the operation.

The MPU 52 generates an operation signal corresponding to an input, and outputs the operation signal in the form of radio waves from the communication unit 54 to the television receiver 10 via the antenna 55. The radio waves are received by the television receiver 10 via the antenna 11. Further, the communication unit 54 receives the radio waves from the television receiver 10 via the antenna 55, demodulates the signal, and outputs the demodulated signal to the MPU 52.

Figure 8:
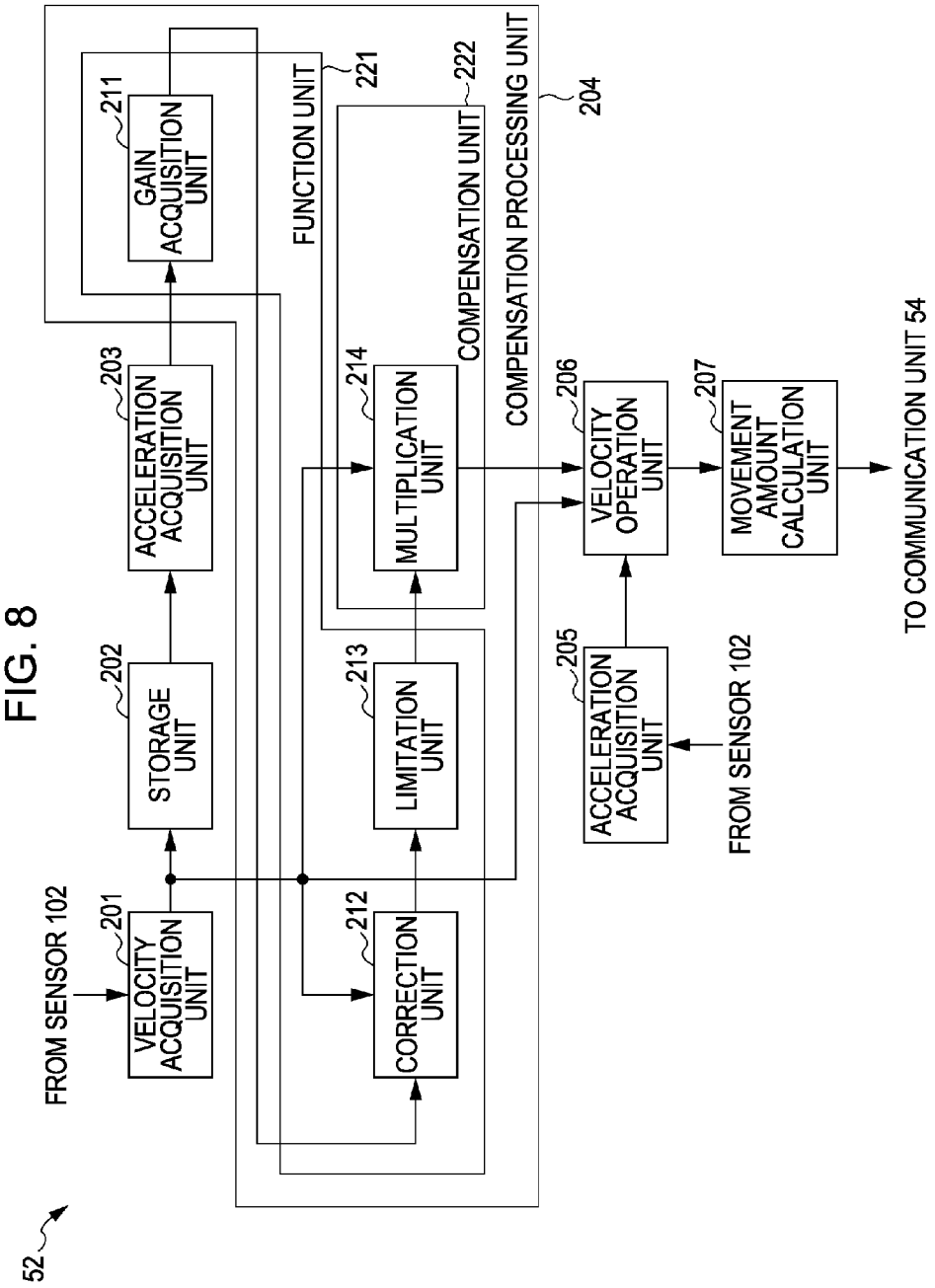
FIG. 8 is a block diagram illustrating a functional configuration of an MPU.

Functional Configuration of MPU in Input Device: FIG. 8 illustrates a functional configuration of the MPU 52 which operates in accordance with a program stored in an internal memory thereof. The MPU 52 includes a velocity acquisition unit 201, a storage unit 202, an acceleration acquisition unit 203, a compensation processing unit 204, an acceleration acquisition unit 205, a velocity operation unit 206, and a movement amount calculation unit 207.

The compensation processing unit 204 is configured to include a function unit 221 and a compensation unit 222. The function unit 221 includes a gain acquisition unit 211, a correction unit 212, and a limitation unit 213. The compensation unit 222 includes a multiplication unit 214.

In this embodiment, the velocity acquisition unit 201 and the acceleration acquisition unit 203 constitute a first acquisition unit which acquires the detected operation signal and a differential value of the operation signal. The velocity acquisition unit 201 acquires, as the operation signal corresponding to the operation by the user, an angular velocity signal from the angular velocity sensor 58 of the sensor 102. The storage unit 202 stores the angular velocity signal acquired by the velocity acquisition unit 201. The acceleration acquisition unit 203, which functions as the first acquisition unit that acquires the acceleration of the operated operation unit, calculates the difference between the angular velocity signal at one step and the angular velocity signal at the next step stored in the storage unit 202, to thereby calculate an angular acceleration signal. That is, the acceleration acquisition unit 203 acquires the angular acceleration signal as the differential value of the angular velocity signal as the operation signal.

The function unit 221, which functions as a second acquisition unit that acquires a function for compensating for a delay in response of the operation signal on the basis of the acquired acceleration, generates a gain G(t) which is a function defined by the acceleration as the differential value acquired by the acceleration acquisition unit 203, or generates a gain G(t) which is a function defined by the velocity as the operation signal acquired by the velocity acquisition unit 201 and the acceleration as the differential value acquired by the acceleration acquisition unit 203. Then, the velocity as the operation signal is multiplied by the generated gain G(t). That is, the operation signal is corrected to perform a process of compensating for the delay.

The gain acquisition unit 211 acquires the gain G(t) corresponding to the acceleration acquired by the acceleration acquisition unit 203. On the basis of the angular velocity acquired by the velocity acquisition unit 201 or the timer value received from the television receiver 10, the correction unit 212 corrects the gain G(t) as appropriate. The limitation unit 213 limits the gain G(t) or the corrected gain G(t) not to exceed a threshold value. The multiplication unit 214, which constitutes the compensation unit 222 functioning as a compensation unit that compensates the operation signal with a function, multiplies the angular velocity acquired by the velocity acquisition unit 201 by the gain G(t) limited by the limitation unit 213, and outputs the corrected angular velocity.

The acceleration acquisition unit 205 acquires the acceleration signal from the acceleration sensor 59 of the sensor 102. The velocity operation unit 206 calculates the velocity by using the corrected angular velocity and the acceleration acquired by the acceleration acquisition unit 205.

On the basis of the velocity supplied from the velocity operation unit 206, the movement amount calculation unit 207 calculates the movement amount of the body 32, and outputs the movement amount to the communication unit 54 as the operation signal of the input device 31.

As described above, the communication unit 54 modulates this signal, and transmits the modulated signal to the television receiver 10 via the antenna 55.

Operation of Input Device: Subsequently, pointer display processing of the input device 31 will be described with reference to FIG. 9. This processing is performed when the user holding the body 32 in his hand operates the first-stage switch of the button 33 or keeps the first-stage switch in the pressed state, and at the same time operates the entire input device 31 in an arbitrary predetermined direction, i.e., the entire input device 31 is operated in an arbitrary direction in a three-dimensional free space to move the pointer 22 displayed on the output unit 16 of the television receiver 10 in a predetermined direction. That is, this processing is performed to output the operation signal for controlling the display on the screen of the television receiver 10 from the input device 31 to the television receiver 10.

At Step S1, the velocity acquisition unit 201 acquires the angular velocity signal output from the sensor 102. That is, the operation performed in a predetermined direction in a three-dimensional free space by the user holding the body 32 in his hand is detected by the angular velocity sensor 58, and a detection signal representing an angular velocity ($\omega x(t)$, $\omega y(t)$) according to the movement of the body 32 is acquired.

At Step S2, the storage unit 202 buffers the acquired angular velocity ($\omega x(t)$, $\omega y(t)$). At Step S3, the acceleration acquisition unit 203 acquires an angular acceleration ($\omega'x(t)$, $\omega'y(t)$). Specifically, the acceleration acquisition unit 203 divides the difference between the angular velocity ($\omega x(t)$, $\omega y(t)$) of this time and the angular velocity ($\omega x(t-1)$, $\omega y(t-1)$) stored the last time in the storage unit 202 by the time therebetween, to thereby calculate the angular acceleration ($\omega'x(t)$, $\omega'y(t)$).

Then, at Steps S4 to S7, the compensation processing unit 204 performs an operation to compensate for the delay in response of the operation signal on the basis of the acquired velocity and acceleration.

That is, at Step S4, the gain acquisition unit 211 acquires the gain G(t) according to the angular acceleration ($\omega'x(t)$, $\omega'y(t)$) acquired at Step S3. This gain G(t) as a function is multiplied by the angular velocity at Step S7 described later. Therefore, a gain G(t) value of 1 serves as a reference value. When the gain G(t) is larger than the reference value, the angular velocity as the operation signal is corrected to be increased. When the gain G(t) is smaller than the reference value, the angular velocity is corrected to be reduced.

In the acceleration phase (i.e., when the angular acceleration as the differential value is positive), the gain G(t) is a value equal to or larger than the reference value (equal to or larger than the value of 1). In the deceleration phase (i.e., when the angular acceleration as the differential value is negative), the gain G(t) is a value smaller than the reference value (smaller than the value of 1). Further, the larger the absolute value of the acceleration is, the larger the difference between the absolute value of the gain G(t) and the reference value (the value of 1) is.

The gain G(t) may be acquired by performing an operation or by reading the gain G(t) from a previously mapped table. Further, the gain G(t) may be obtained separately for the X-direction and the Y-direction. Alternatively, the larger one of the respective absolute values of the two values may be selected as a representative value, for example, to obtain a single gain G(t).

At Step S5, the correction unit 212 corrects the gain G(t) on the basis of the angular velocity ($\omega x(t)$, $\omega y(t)$) acquired by the velocity acquisition unit 201. Specifically, the gain G(t) is corrected such that the larger the angular velocity ($\omega x(t)$, $\omega y(t)$) is, the closer to the reference value (the value of 1) the gain G(t) is. That is, in this embodiment, with the process of Step S4 (the process based on the angular acceleration) and the process of Step S5 (the process based on the angular velocity), the gain G(t) is acquired which is the function defined by both the angular velocity as the operation signal and the angular acceleration as the differential value of the angular velocity.

Also in this case, the corrected value may be obtained separately for the X-direction and the Y-direction, or the larger one of the respective absolute values of the two values may be selected as a representative value, for example, to obtain a single corrected value.

At Step S6, the limitation unit 213 limits the gain G(t) not to exceed the threshold value. That is, the corrected gain G(t) is limited to be within the range of the predetermined threshold value. In other words, the threshold value is set to be the maximum or minimum value, and the absolute value of the gain G(t) is limited not to exceed the threshold value. If the input device 31 is vibrated, therefore, a situation is suppressed in which the absolute value of the gain G(t) is too small to compensate for the delay or too large to prevent oscillation.

The processes of Steps S4 to S6 can be performed by a single reading process, if the gain G(t) has previously been mapped in the gain acquisition unit 211 to satisfy the conditions of the respective steps.

Figure 10:
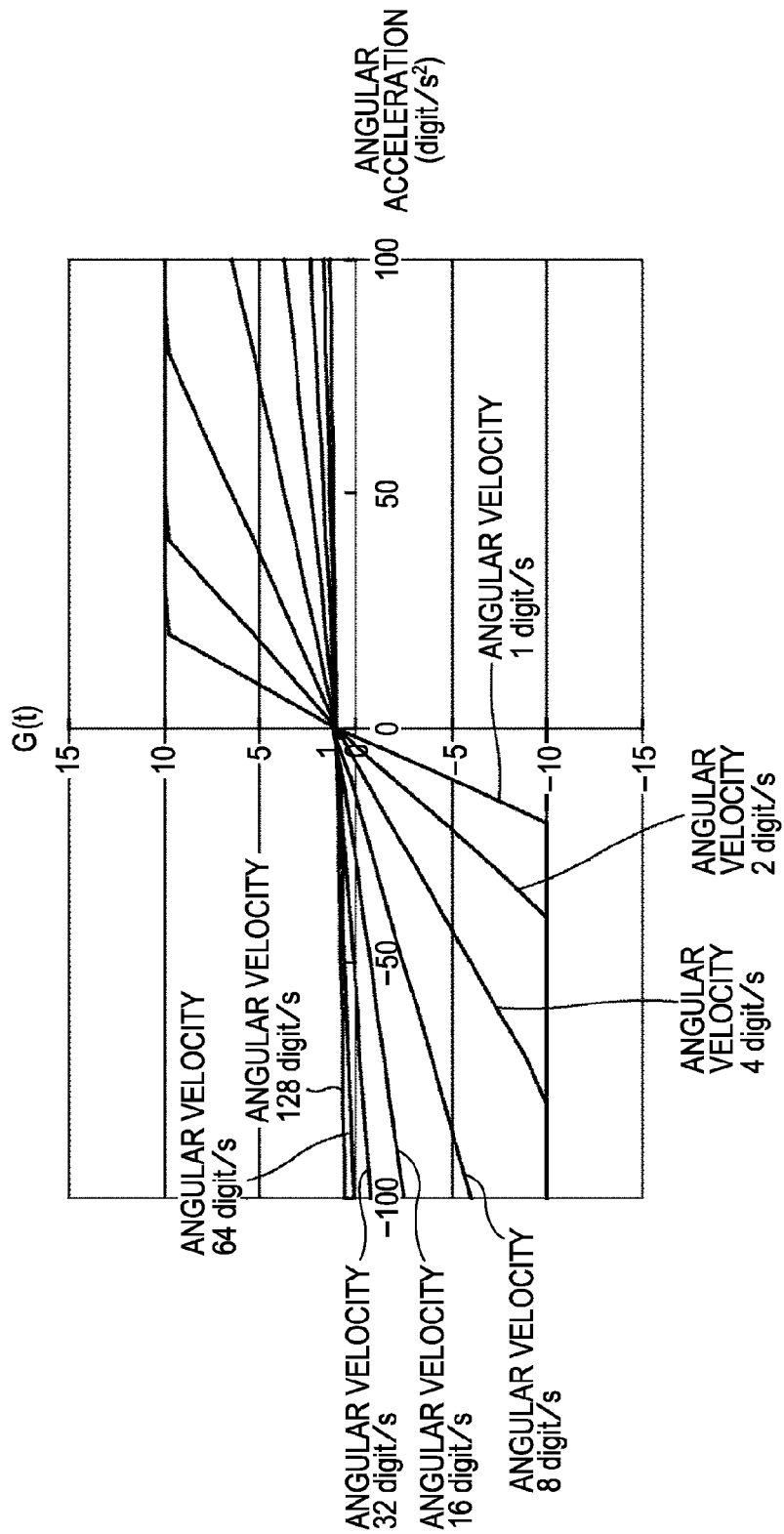
FIG. 10 is a diagram explaining characteristics of a gain.

FIG. 10 illustrates an example of mapping satisfying these conditions. In this embodiment, the horizontal axis and the vertical axis represent the angular acceleration and the gain G(t), respectively. The gain G(t) is represented by a straight line with an intercept of 1 and a positive slope for each of angular velocities. The angular velocity is represented in absolute value.

Therefore, if the angular acceleration represented by the horizontal axis in the drawing is positive (in the right half region of FIG. 10), the gain G(t) represented by the vertical axis is a value equal to or larger than the reference value (the value of 1). If the angular acceleration is negative (in the left half region of FIG. 10), the gain G(t) is a value smaller than the reference value (the value of 1) (Step S4).

Further, the gain G(t) is a value represented by a straight line with an intercept corresponding to the reference value (the value of 1) and a positive slope. Therefore, the larger the absolute value of the angular acceleration is, the larger the absolute value of the difference between the absolute value of the gain G(t) and the reference value (the value of 1) is (Step S4). In other words, the gain G(t) is set to a value with which the larger the absolute value of the angular acceleration as the differential value is, the larger the correction amount of the angular velocity as the operation signal is. For example, in the case of an angular velocity of 1 digit/s, when the angular acceleration is 5 digit/s² (i.e., the absolute value of the angular acceleration is small), the value of the gain G(t) is approximately 3 (the absolute value of the difference from the value of 1 is 2, which is small). Meanwhile, when the angular acceleration is −10 digit/s² (i.e., the absolute value of the angular acceleration is large), the value of the gain G(t) is approximately −5 (the absolute value of the difference from the value of 1 is 6, which is large).

Further, the larger the angular velocity is, the closer to the reference value (the value of 1) the gain G(t) is (Step S5). In other words, the gain G(t) is set to a value with which the smaller the angular velocity as the operation signal is, the larger the correction amount of the angular velocity is. For example, in the case of an angular acceleration of 15 digit/s², when the angular velocity is 1 digit/s (i.e., when the angular velocity is small), the gain G(t) is approximately 8 (i.e., the absolute value of the gain G(t) is large). Meanwhile, when the angular velocity is 2 digit/s (i.e., the angular velocity is large), the gain G(t) is approximately 5 (i.e., the absolute value of the gain G(t) is small). In the case of an angular acceleration of −50 digit/s², when the angular velocity is 4 digit/s (i.e., when the angular velocity is small), the gain G(t) is approximately −6 (i.e., the absolute value of the gain G(t) is large). Meanwhile, when the angular velocity is 16 digit/s (i.e., when the angular velocity is large), the gain G(t) is approximately −1 (i.e., the absolute value of the gain G(t) is small).

Further, the above indicates that practically the correction of the angular velocity is performed only when the angular velocity is small, and is not performed when the angular velocity is large. In FIG. 10, when the angular velocity is large, as in the angular velocity of 64 digit/s or 128 digit/s, the gain G(t) is a value equal or close to the reference value (the value of 1). Practically, therefore, the velocity is not corrected. That is, the correction of the angular velocity is performed immediately after the start of the movement of the input device 31 and immediately before the stop of the movement.

With the absolute value of the gain G(t) thus increased in accordance with the reduction in the angular velocity, natural operational feeling can be realized.

Further, the value of the gain G(t) is limited to be within the range from a threshold value of −10 to a threshold value of 10, i.e., limited not to exceed these threshold values (Step S6). That is, the maximum value of the gain G(t) is to be the threshold value of 10, and the minimum value of the gain G(t) is set to be the threshold value of −10.

The respective lines representing the characteristics of the respective velocities in FIG. 10 may not be straight lines, and may be curved lines.

At Step S7, the multiplication unit 214 multiplies the angular velocity (ωx(t), ωy(t)) as the operation signal by the gain G(t). That is, the angular velocity is multiplied by the gain G(t) as a coefficient, and thereby the corrected angular velocity (ωx1(t), ωy1(t)) is generated. For example, if the gain G(t) is used as the representative value integrating the value in the X-axis direction and the value in the Y-axis direction, the corrected angular velocity (ωx1(t), ωy1(t)) is calculated with the following formula.

$$\omega x1(t)=\omega x(t)\cdot G(t)$$

$$\omega y1(t)=\omega y(t)\cdot G(t) \quad (1)$$

At Step S8, the velocity operation unit 206 calculates a velocity (Vx(t), Vy(t)). The velocity is obtained by the multiplication of the angular velocity by the radius of gyration. That is, the motion of the input device 31 occurring when the user operates the input device 31 corresponds to the combination of rotational motions centering around a shoulder, elbow, or wrist of the user. Further, the radius of gyration of the motion corresponds to the distance from the rotational center of the combined rotational motions, which changes over time, to the input device 31.

When the velocity of the input device 31 is represented as (Vx(t), Vy(t)), the radius of gyration (Rx, Ry) is represented by the following formula.

$$(Rx,Ry)=(Vx(t),Vy(t))/(\omega x(t),\omega y(t)) \quad (2)$$

In the formula (2), (Vx(t), Vy(t)) and (ωx(t), ωy(t)) on the right side represent the dimension of the velocity. Even if each of the velocity and the angular velocity represented by the right side of this formula (2) is differentiated to represent the dimension of the acceleration or the time rate of change of the acceleration, the correlation is not lost. Similarly, even if each of the velocity and the angular velocity is integrated to represent the dimension of the displacement, the correlation is not lost.

Therefore, when the velocity and the angular velocity represented by the right side of the formula (2) are used to represent the dimension of the displacement, the acceleration, or the time rate of change of the acceleration, the following formulae (3) to (5) are obtained.

$$(Rx,Ry)=(x(t),y(t))/(\psi(t),\theta(t)) \quad (3)$$

$$(Rx,Ry)=(ax(t),ay(t))/(\omega' x(t),\omega' y(t)) \quad (4)$$

$$(Rx,Ry)=(a'x(t),a'y(t))/(\omega'' x(t),\omega'' y(t)) \quad (5)$$

It is understood from, for example, the formula (5) of the above formulae that the radius of gyration (Rx, Ry) is obtained if the value of change (a'x(t), a'y(t)) of the acceleration (ax(t), ay(t)) and the value of change (ω"x(t), ω"y(t)) of the angular acceleration (ω'x(t), ω'y(t)) are known. In this embodiment, the radius (Rx, Ry) is obtained on the basis of the formula (5).

That is, the acceleration acquisition unit 205 acquires the acceleration (ax(t), ay(t)) detected by the acceleration sensor 59 constituting the sensor 102. Therefore, the velocity operation unit 206 differentiates the acceleration (ax(t), ay(t)) to calculate the value of change (a'x(t), a'y(t)) of the acceleration. Further, the velocity operation unit 206 performs a second-order differentiation on the angular velocity (ωx(t), ωy(t)) detected by the velocity acquisition unit 201, to thereby calculate the rate of change ($\omega''x(t)$, $\omega''y(t)$) of the angular acceleration ($\omega'x(t)$, $\omega'y(t)$). Then, the velocity operation unit 206 divides the rate of change ($a'x(t)$, $a'y(t)$) of the acceleration by the rate of change ($\omega''x(t)$, $\omega''y(t)$) of the angular acceleration ($\omega'x(t)$, $\omega'y(t)$) to calculate the radius of gyration (Rx, Ry).

Further, the velocity operation unit 206 multiplies the obtained radius (Rx, Ry) by the angular velocity to calculate the velocity (Vx(t), Vy(t)). As the angular velocity, the corrected angular velocity ($\omega x1(t)$, $\omega y1(t)$), i.e., the angular velocity ($\omega x(t)$, $\omega y(t)$) multiplied by the gain G(t) is used.

At Step S9, the movement amount calculation unit 207 calculates the pointer movement amount by using the corrected angular velocity ($\omega x1(t)$, $\omega y1(t)$), and outputs the calculated pointer movement amount. The movement amount calculation unit 207 adds the velocity to the immediately preceding position coordinates of the pointer 22 to calculate new position coordinates. That is, the displacement per unit time in the X-direction and the Y-direction of the input device 31 is converted into the displacement amount per unit time in the X-direction and the Y-direction of the pointer 22 displayed on the image display unit of the output unit 16. Thereby, the pointer movement amount is calculated such that the larger the gain G(t) is, i.e., the larger the correction amount of the angular velocity as the operation signal is, the larger the compensation amount of the delay in response is. That is, as the gain G(t) is increased, the delay between the operation of the input device 31 and the movement of the pointer 22 is reduced. If the value of the gain G(t) is further increased, the movement of the pointer 22 is more advanced in phase than the operation of the input device 31.

As a simpler method, Step S8 may be omitted, and the pointer movement amount may be obtained with the use of the corrected angular velocity obtained at Step S7.

Further, the processes performed here include a process of removing a hand-shake component of the input device 31 through a low-pass filter, and a process of, when the operation velocity is low (a low velocity and a low acceleration), setting an extremely low moving velocity of the pointer 22 to make it easy to stop the pointer 22 on the icon 21. Also, other processes are performed to prevent a situation in which the movement of the input device 31 occurs during the operation of the button 33 or 34, for example, and is erroneously identified as the operation of the entire input device 31 to cause the movement of the pointer 22. These processes include a process of prohibiting the movement of the pointer 22 during the button operation, and a process for correcting the inclination of the input device 31 by setting the gravity direction detected by the acceleration sensor 59 as the lower direction.

The above-described processes are repeatedly performed during the operation of the body 32.

The operation signal representing the pointer movement amount is transmitted from the communication unit 54 to the television receiver 10 via the antenna 55.

In the television receiver 10, the communication unit 12 receives the signal from the input device 31 via the antenna 11. The MPU 13 maps the video RAM 15 such that the pointer 22 is displayed at a position corresponding to the received signal. As a result, in the output unit 16, the pointer 22 is displayed at a position corresponding to the operation by the user.

Figure 9:
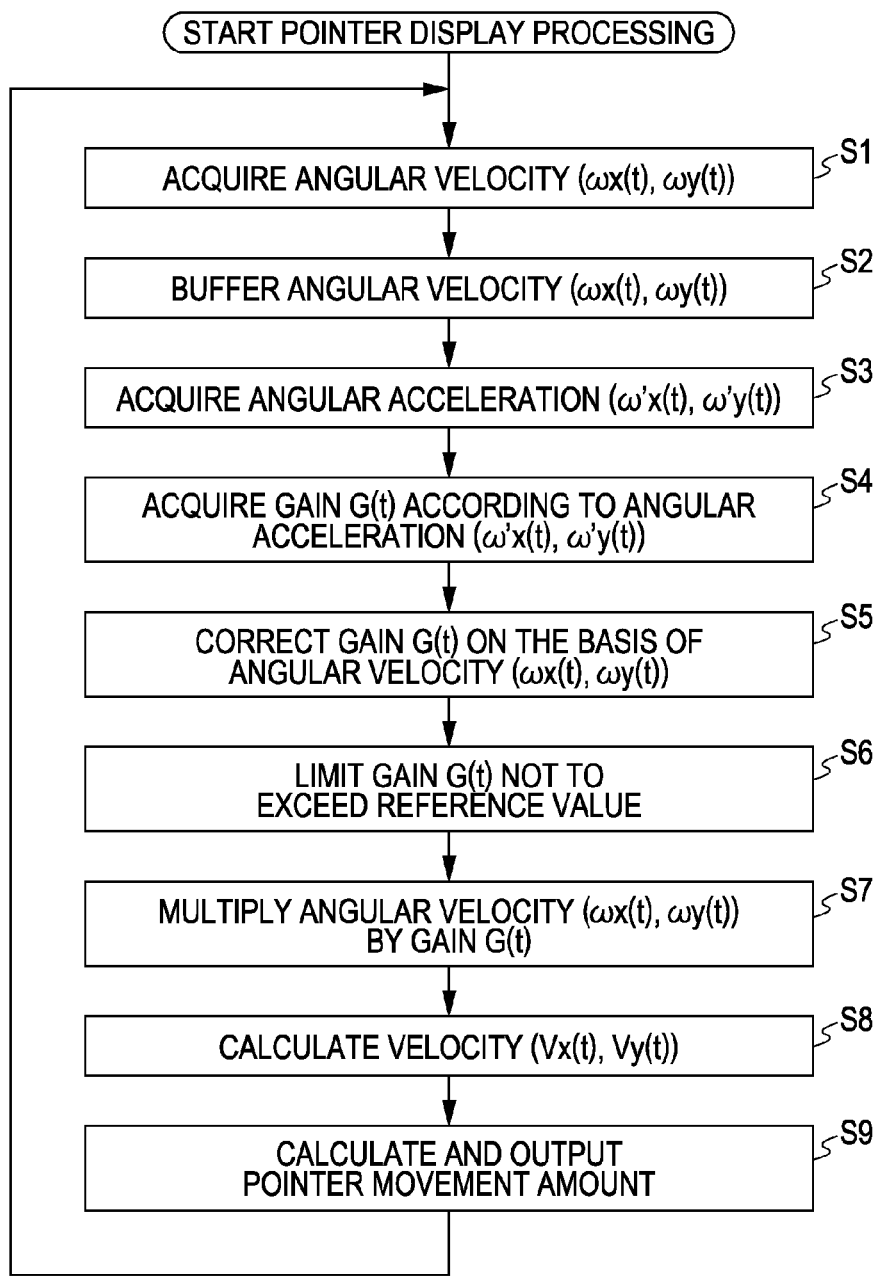
FIG. 9 is a flowchart explaining pointer display processing of the input device.

A part or all of the respective processes of Steps S1 to S9 in FIG. 9 can also be performed by the television receiver 10. For example, it is possible to perform the processes up to Step S8 in the input device 31 and perform the process of Step S9 in the television receiver 10. With this configuration, it is possible to simplify the configuration of the input device 31 and reduce the load on the input device 31. In this case, a part or all of the functional blocks in FIG. 8 is provided to the television receiver 10.

Further, the angular velocity and angular acceleration used in the above-described processes can be replaced by simple velocity and acceleration.

Figure 11:
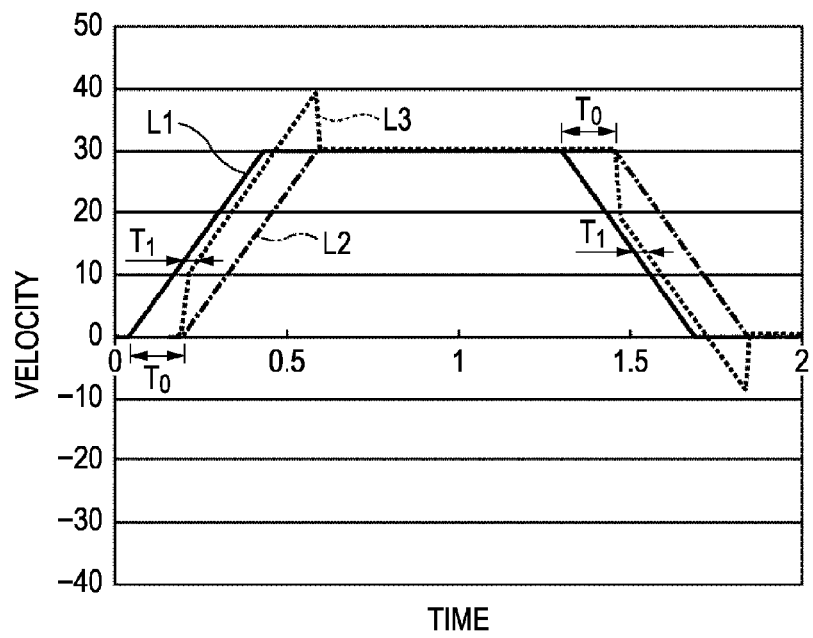
FIG. 11 is a diagram illustrating changes in velocity.
Figure 12:
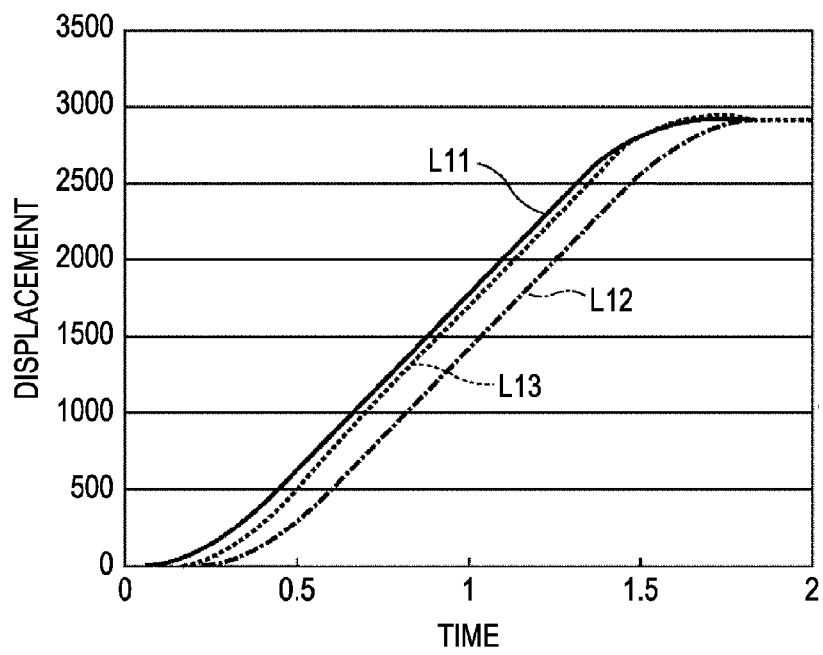
FIG. 12 is a diagram illustrating changes in displacement.

Characteristics of Input Device: FIGS. 11 and 12 illustrate the movement of the pointer 22 occurring when the user performs an operation of moving the input device 31 in a predetermined direction and then stopping the input device 31. In FIG. 11, the vertical axis represents the velocity, and the horizontal axis represents the time. In FIG. 12, the vertical axis represents the displacement, and the horizontal axis represents the time. The unit shown in the respective drawings is a relative value used in a simulation. The same applies to other drawings illustrating characteristics described later.

In FIG. 11 illustrating changes in velocity, a line L1 represents the velocity corresponding to an actual operation (i.e., the ideal state in which the delay of the pointer 22 is absent). The velocity gradually increases from a velocity of 0 at a constant rate, and reaches a velocity of 30. Then, the velocity is maintained for a predetermined time. Thereafter, the velocity gradually decreases from the velocity of 30 at a constant rate, and reaches the velocity of 0. A line L2 represents the velocity in a system having a delay in response, i.e., the velocity of the pointer 22 in a system having a time delay between the operation of the input device 31 and the movement of the pointer 22 in response to the operation. The line L2 is similar in characteristic to the line L1, but is delayed (i.e., delayed in phase) from the line L1 by a time $T_0$. That is, when the input device 31 is operated by the user, the velocity of the operation changes as indicated by the line L1. However, the operation signal corresponding to the operation is detected with a delay. Therefore, the velocity of the operation signal (which corresponds to the velocity of the pointer 22 controlled on the basis of the operation signal) changes as indicated by the line L2.

A line L3 represents the result of the process of compensating for the delay, as illustrated in the flowchart of FIG. 9. At the start of the motion, the start point of the change in velocity of the line L3 is the same as the start point of the line L2. The velocity of the line L3 rapidly increases at the start point, at which the velocity is 0, with a slope steeper than the slope of the line L2 (i.e., with a larger absolute value of the acceleration) to exceed the line L2, and reaches a value located slightly below and close to the line L1. In other words, immediately after the start of the motion, the line L3 representing the result of compensation rapidly obtains a characteristic substantially the same as the characteristic of the line L1 which has no delay. In terms of the position in the drawing, immediately after the start of the motion, the line L3 is located above the line L2 and close to and below the line L1. That is, the delay time rapidly shifts from the maximum time $T_0$ to the minimum time $T_1$. This means that a prompt response is made upon start of the operation by the user. That is, it is understood that the line L3 is a line resembling the line L1 and compensating for the delay of the line L2.

Thereafter, in the vicinity of the line L1, the line L3 gradually increases with a constant slope substantially similar to the slope of the line L1 (therefore, the line L2) (i.e., with the constant delay time $T_1$). The line L3 is more advanced in phase than the line L2, but is slightly delayed in phase from the line L1 (i.e., in FIG. 11, the line L3 is located above and on the left side of the line L2, but is located slightly below and on the right side of the line L1). That is, immediately after the start of the movement, the pointer 22 is accelerated with little delay (with the minimum delay time $T_1$).

The line L3 exceeds the velocity of 30 and further increases. Then, at timing immediately before the line L2 reaches the constant velocity of 30, the line L3 reaches a velocity of 40, and thereafter rapidly decreases with a steep slope to fall to the velocity of 30. This means that the transitional increase in velocity rapidly ceases and the line L3 reaches a stable velocity.

Thereafter, the velocity of the line L3 remains at the constant value of 30 for a predetermined time. That is, the velocity of the pointer 22 gradually increases from the value of 0, and thereafter is stabilized at the value of 30.

When the motion is stopped, the velocity of the line L3 remains at the value of 30 for a while, even after the velocity of the line L1 starts to fall below the value of 30. Then, at timing immediately before the velocity of the line L2 starts to decrease from the value of 30, the line L3 rapidly decreases with a steep slope (i.e., with a larger absolute value of the acceleration) to fall to a velocity of 18, which is a value close to and above the line L1. That is, the delay time rapidly shifts from the maximum value $T_0$ to the minimum value $T_1$. This means that a prompt response is made when the user attempts to stop the operation. That is, it is understood that the line L3 is a line resembling the line L1 and compensating for the delay of the line L2, and that the delay has been compensated for.

Thereafter, in the vicinity of the line L1, the line L3 gradually decreases with a slope substantially similar to the slope of the line L1 (therefore, the line L2), which is a constant slope (i.e., with the constant delay time $T_1$). The line L3 is more advanced in phase than the line L2, but is slightly delayed in phase from the line L1 (i.e., in FIG. 11, the line L3 is located below and on the left side of the line L2, but is slightly above and on the right side of the line L1). That is, immediately after the start of the stopping operation of the movement, the pointer 22 is decelerated with little delay (with the minimum delay time $T_1$).

The line L3 falls below the velocity of 0 and further decreases. Then, at timing immediately before the velocity of the line L2 reaches the velocity of 0, the velocity of the line L3 reaches a velocity of approximately −9, and thereafter increases with a steep slope (i.e., rapidly) to reach the velocity of 0. This means that the transitional decrease in velocity rapidly ceases and the line L3 reaches the velocity of 0.

Eventually, the line L3 has a characteristic close to the characteristic of the line L1, in which the delay of the line L2 has been compensated for.

FIG. 12 illustrates displacements of the pointer 22 corresponding to the changes in velocity of FIG. 11. A line L11 represents the displacement corresponding to the actual operation (i.e., the displacement with no delay). A line L12 represents the displacement of the system having a delay. A line L13 represents the result of the process of compensating for the delay, as illustrated in the flowchart of FIG. 9.

The line L11 has a characteristic of increasing from a displacement of 0 with a substantially constant slope and thereafter reaching a displacement of approximately 2900. The line L12 is substantially the same in characteristic of change as the line L11, but is delayed (i.e., delayed in phase) from the line L11. In the drawing, the line L12 is located below and on the right side of the line L11.

The line L13 starts to be displaced at a start point substantially the same as the start point of the line L12, and swiftly reaches a value close to the line L11. Thereafter, the line L13 gradually increases at a constant rate with a slope substantially similar to the slope of the line L11 (therefore, the line L12). The line L13 is higher than the line L12 but slightly lower than the line L11. That is, in FIG. 12, the line L13 is higher than the line L12 and close to and lower than the line L11. As described above, the line L13 is a line having a characteristic resembling the characteristic of the line L11, and compensating for the delay of the line L12.

Immediately before reaching the displacement of 2900, the line L13 slightly exceeds the line L11 (i.e., in FIG. 12, the line L13 is located slightly above the line L11), and thereafter converges to the constant value of 2900. As described above, the line L13 is a line having a characteristic resembling the characteristic of the line L11, and compensating for the delay of the line L12.

As a result, the user can operate the input device 31 in an arbitrary direction in a free space to, for example, swiftly move the pointer 22 to the desired icon 21 located in the direction of the operation and stop the pointer 22 at the location. In this operation, the uncomfortable operational feeling felt by the user is suppressed. That is, a situation is suppressed in which the user feels that the movement of the pointer 22 starts later than the start of the operation of the input device 31, or that the movement of the pointer 22 stops later than the stop of the operation of the input device 31. As a result, the operational feeling can be improved.

This is noticeable in a so-called consumer-use electronic device. That is, in the consumer-use electronic device, the clock of the MPU is slower and the delay is longer than in a business-use electronic device. Even in the case of such an electronic device, however, the unconformable operational feeling felt by the user is suppressed, and the operational feeling can be improved.

Description has been made above on the operation of moving the pointer 22. The operational feeling can also be similarly improved, when the present invention is applied to other operations on a GUI (Graphical User Interface) screen, such as scrolling, zooming (scaling up and down), and rotation.

Figure 13A:
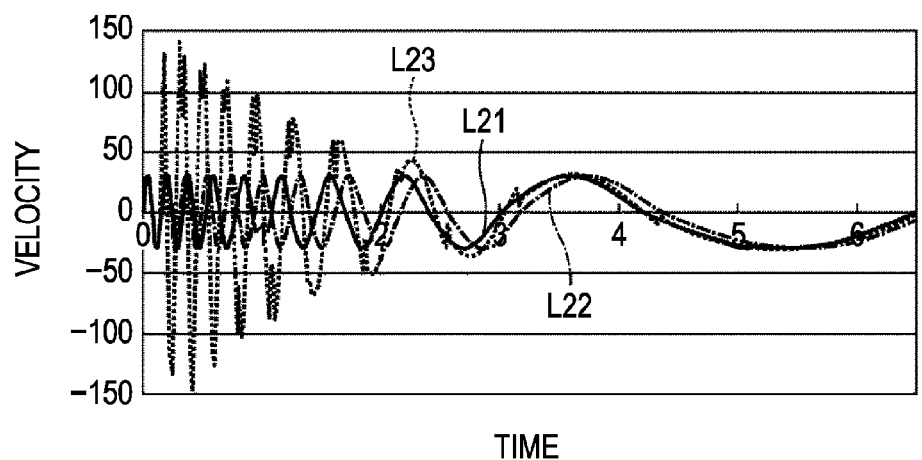
FIGS. 13A and 13B are diagrams illustrating changes in characteristics occurring when the input device is vibrated.
Figure 13B:
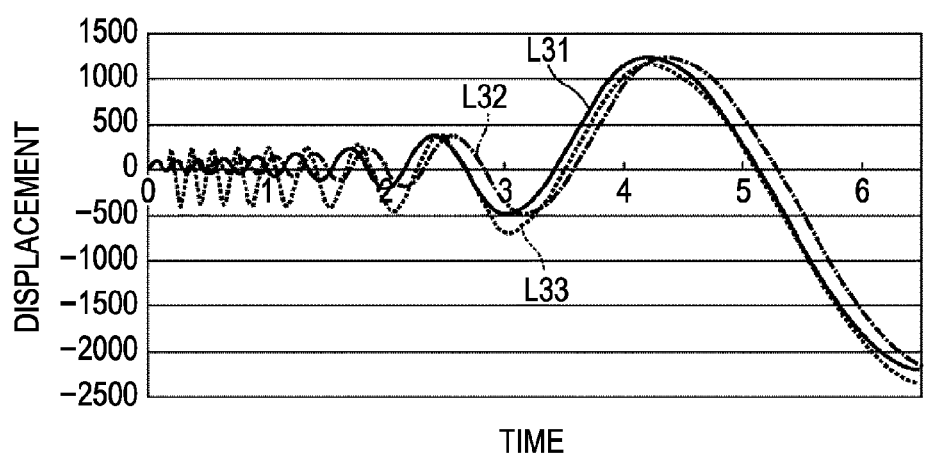

FIGS. 13A and 13B illustrate characteristics obtained when the input device 31 is vibrated. The vertical axis represents the velocity in FIG. 13A and the displacement in FIG. 13B. The horizontal axis represents the time in both drawings.

In FIG. 13A, lines L21, L22, and L23 represent the result of a case in which there is no delay, the result of a case in which there is a delay, and the result of a case in which the delay has been compensated for, respectively. In FIG. 13B, lines L31, L32, and L33 represent the result of the case in which there is no delay, the result of the case in which there is a delay, and the result of the case in which the delay has been compensated for, respectively. It is understood that, when the frequency of the vibration of the input device 31 is high, the delay has not been compensated for and oscillation is occurring.

Figure 14A:
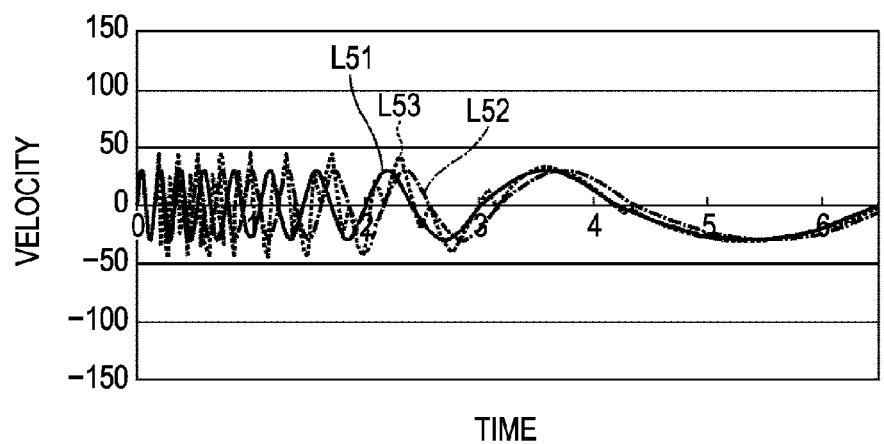
FIGS. 14A and 14B are diagrams illustrating changes in characteristics occurring when the input device is vibrated.
Figure 14B:
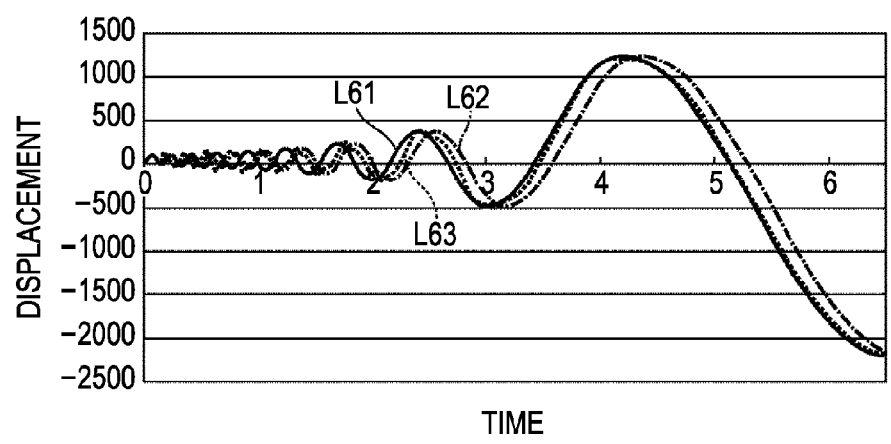

FIGS. 14A and 14B illustrate characteristics obtained when the gain G(t) has been limited and the input device 31 is vibrated. The vertical axis represents the velocity in FIG. 14A and the displacement in FIG. 14B. The horizontal axis represents the time in both drawings.

In FIG. 14A, lines L51, L52, and L53 represent the result of a case in which there is no delay, the result of a case in which there is a delay, and the result of a case in which the delay has been compensated for, respectively. In FIG. 14B, lines L61, L62, and L63 represent the result of the case in which there is no delay, the result of the case in which there is a delay, and the result of the case in which the delay has been compensated for, respectively. It is understood from these drawings that the oscillation is suppressed. This suppression of oscillation is the effect of the process of Step S6 in FIG. 9.

A similar effect can also be achieved by the elimination of oscillation frequency through a low-pass filter.

Figure 15:
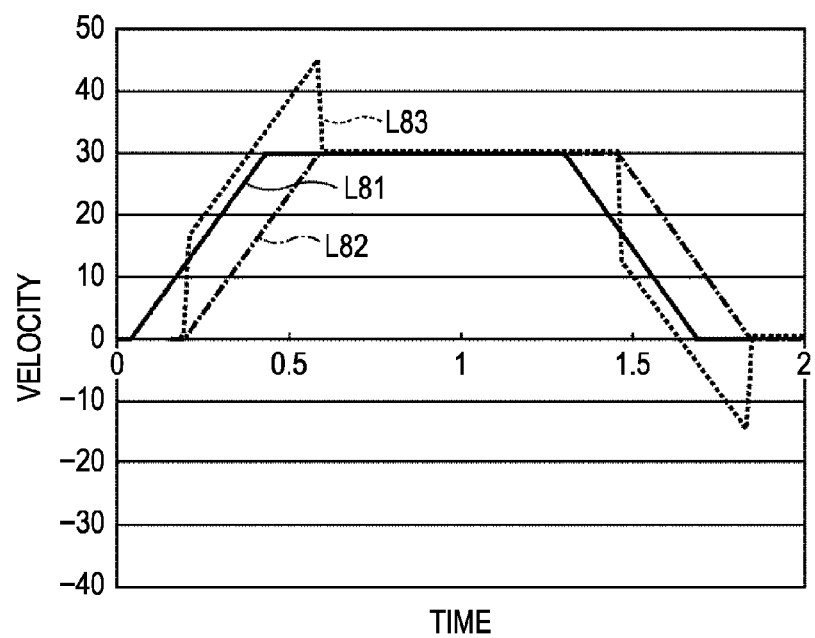
FIG. 15 is a diagram illustrating changes in velocity.
Figure 16:
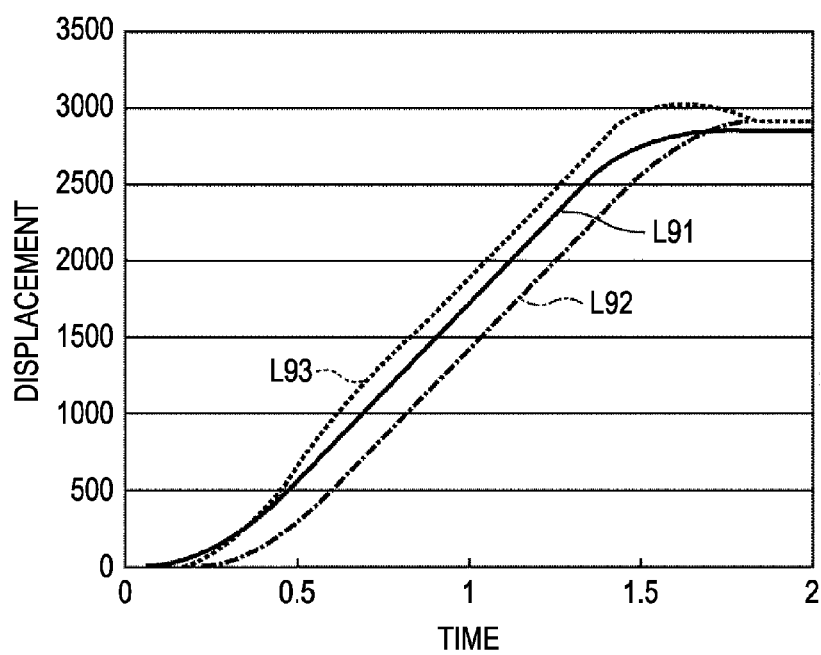
FIG. 16 is a diagram illustrating changes in displacement.

It is also possible in the present embodiment to look ahead the operation by the user. That is, the delay can be overly compensated for to make the movement of the pointer 22 more advanced in phase than the operation by the user. This compensation can be achieved by increasing the value of the gain G(t). FIGS. 15 and 16 illustrate characteristics obtained in this case. FIGS. 15 and 16 correspond to FIGS. 11 and 12, respectively. Lines L81, L82, and L83 in FIG. 15 correspond to the lines L1, L2, and L3 in FIG. 11, respectively. Lines L91, L92, and L93 in FIG. 16 correspond to the lines L11, L12, and L13 in FIG. 12, respectively.

As obvious from the comparison of FIG. 15 with FIG. 11, in FIG. 15, the line L83 immediately after the start of the motion rapidly increases at the same start point as the start point of the line L82, and thereafter exceeds the line L81 (the line L83 is located above and on the left side of the line L81 in the drawing). Thereafter, the line L83 gradually increases with the same slope as the slope of the line L81. Further, when the motion is stopped, the line L83 rapidly decreases from the constant value of 30 to fall below the line L81 (the line L83 is located below and on the left side of the line L81 in the drawing), and thereafter gradually decreases with the same slope as the slope of the line L81.

Also in FIG. 16, immediately after the start of the motion, the line L93 is higher than the line L92, and also rapidly increases to exceed the line L91. Thereafter, in the vicinity of the line L91, the line L93 increases substantially similarly to the line L91, and converges to the displacement of 2900.

In this case, the movement of the pointer 22 precedes the operation by the user.

Figure 17:
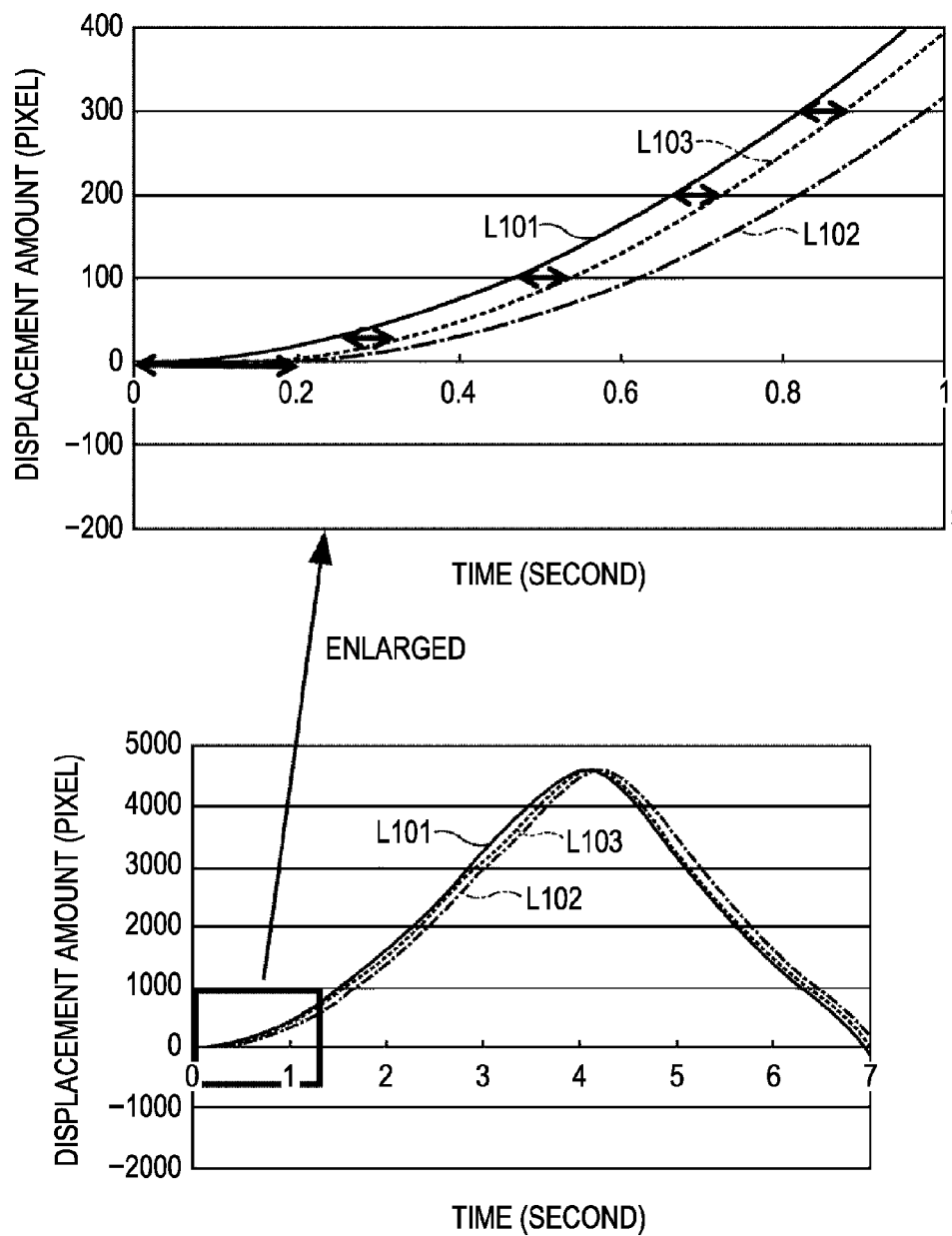
FIG. 17 is a diagram illustrating changes in displacement.
Figure 18:
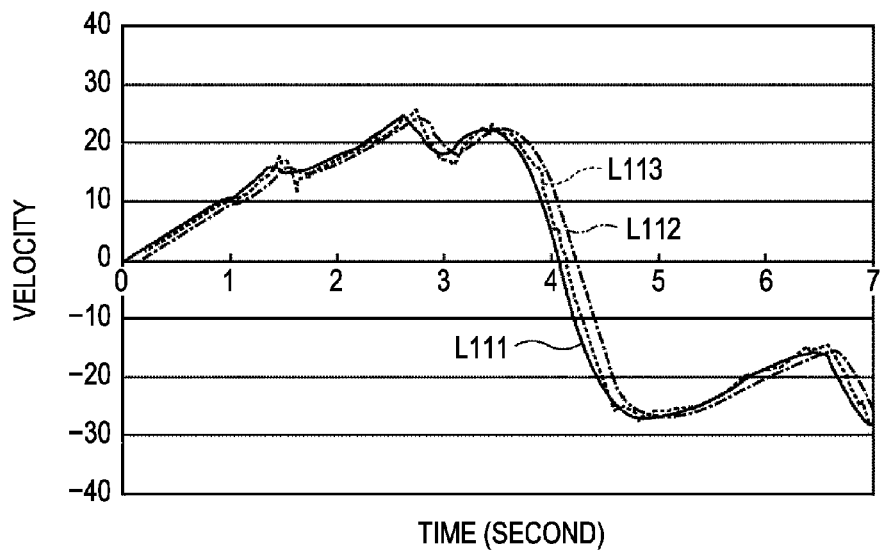
FIG. 18 is a diagram illustrating changes in velocity.
Figure 19:
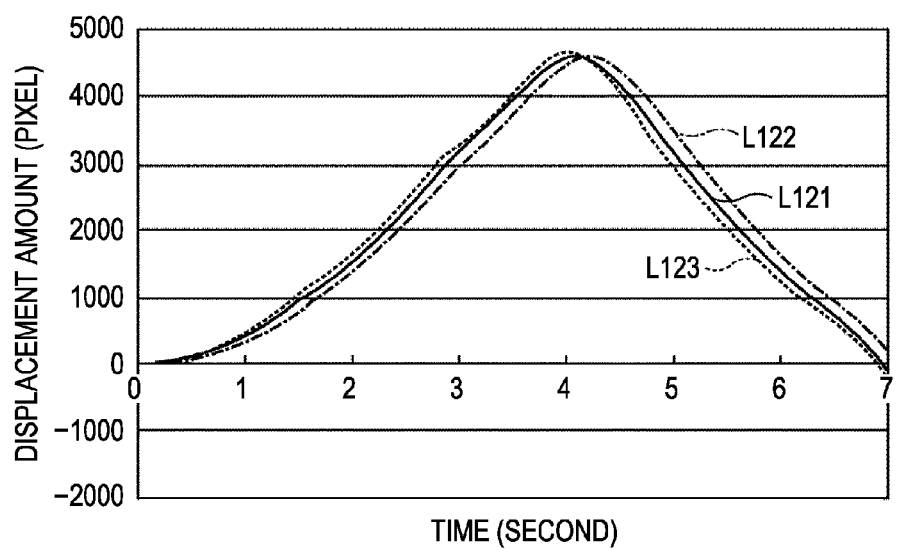
FIG. 19 is a diagram illustrating changes in displacement.
Figure 20:
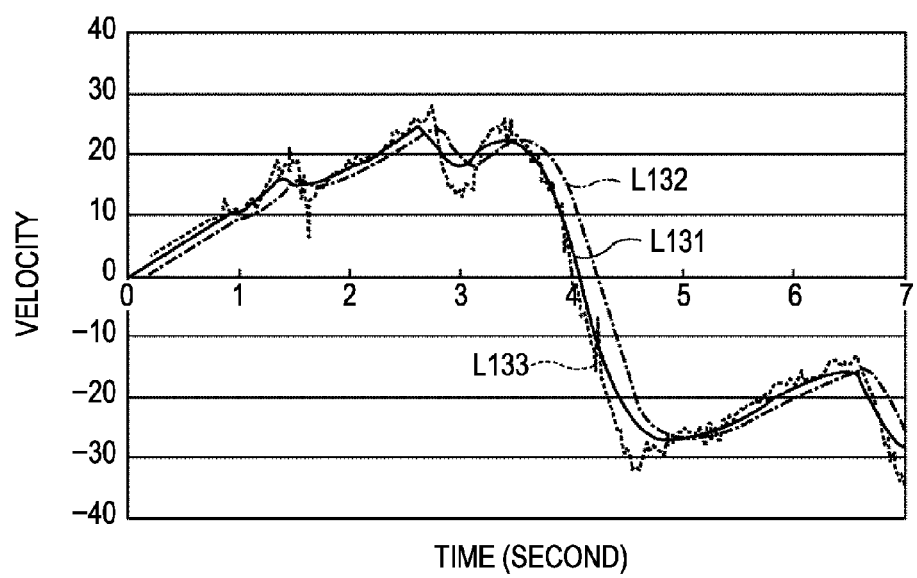
FIG. 20 is a diagram illustrating changes in velocity.
Figure 21:
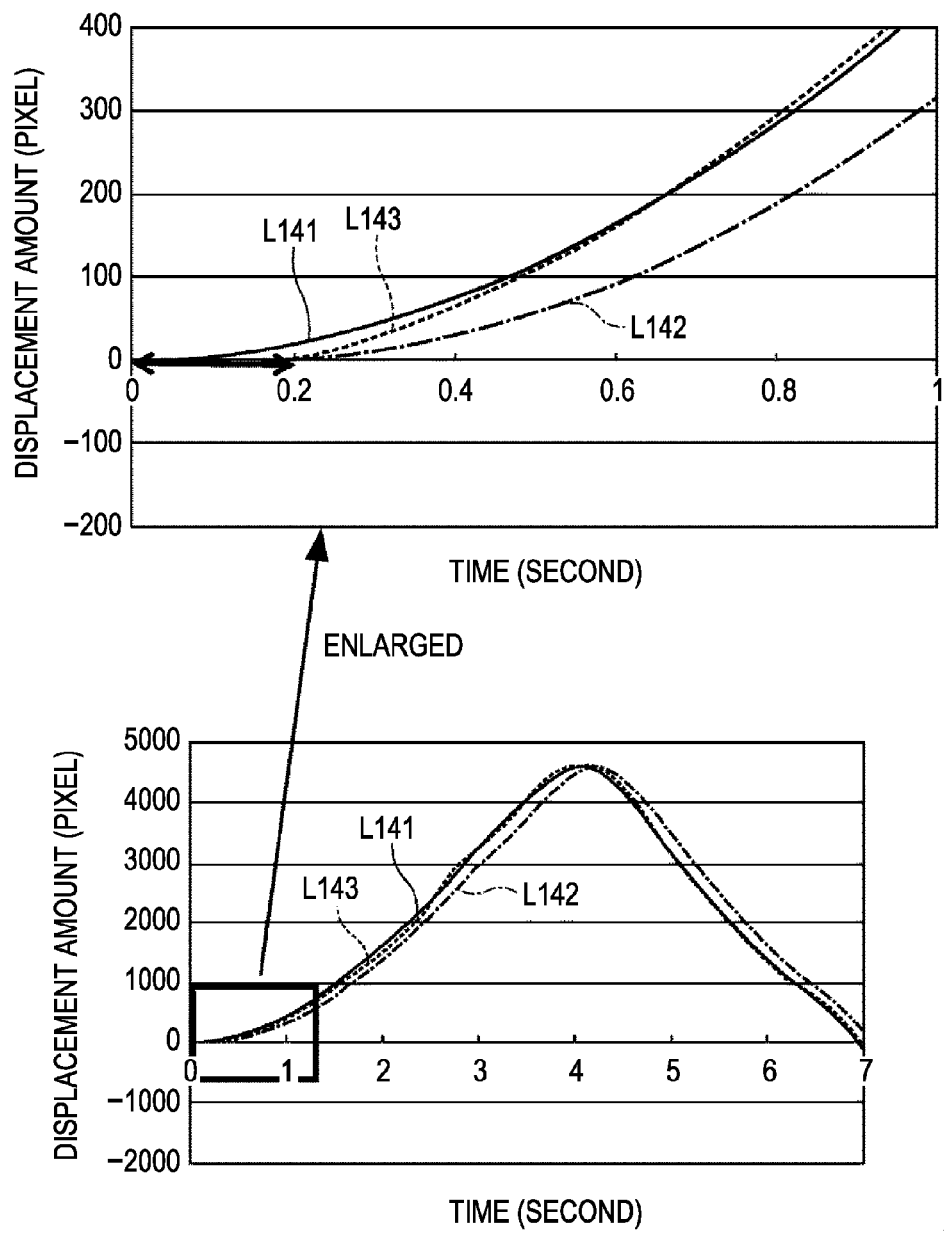
FIG. 21 is a diagram illustrating changes in displacement.
Figure 22:
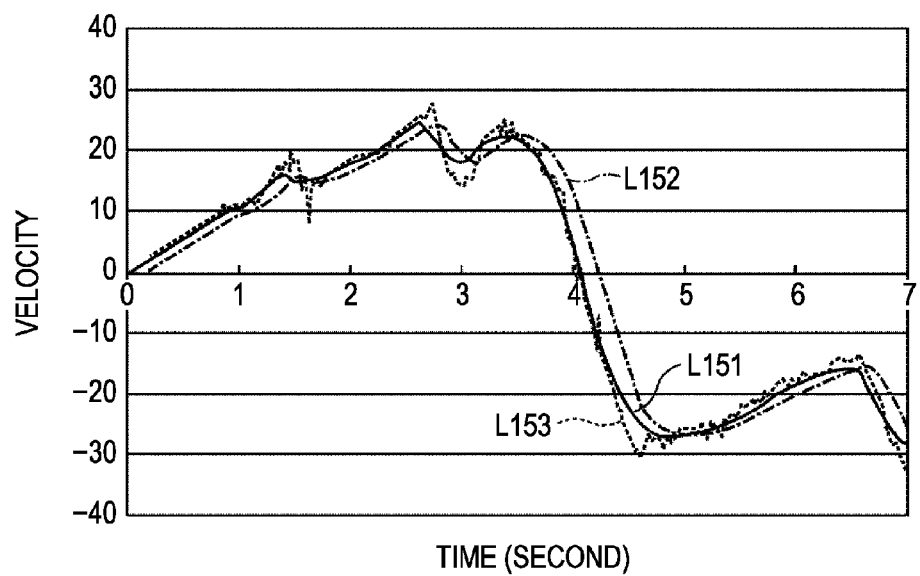
FIG. 22 is a diagram illustrating changes in velocity.

Then, comparison is made among three cases, i.e., a case in which compensation has been made to maintain a slight delay, a case in which compensation has been made to advance in phase the movement of the pointer 22, and a case in which compensation has been made to set the delay to be substantially zero. FIGS. 17 to 22 illustrate the results of the comparison. FIGS. 17 and 18 illustrate the case in which compensation has been made to maintain a slight delay. FIGS. 19 and 20 illustrate the case in which compensation has been made to advance in phase the movement of the pointer 22. FIGS. 21 and 22 illustrate the case in which compensation has been made to set the delay to be substantially zero. All of the drawings illustrate a case in which the pointer 22 is moved in a predetermined direction and thereafter moved in the opposite direction.

The vertical axis represents the displacement amount in FIGS. 17, 19, and 21 and the velocity in FIGS. 18, 20, and 22. The horizontal axis represents the time in all of the drawings.

In FIGS. 17 and 18, lines L101 and L111 represent the results of a case in which there is no delay, and lines L102 and L112 represent the results of a case in which there is a delay of 0.2 seconds in the system (a case in which compensation is not made). Further, lines L103 and L113 represent the results of a case in which compensation has been made to maintain a slight delay. In FIG. 17, the line L103 is located between the lines L101 and L102. Also in FIG. 18, the line L113 is located between the lines L111 and L112. It is therefore understood that the compensation has been made to reduce the delay to a time shorter than 0.2 seconds.

In FIGS. 19 and 20, lines L121 and L131 represent the results of a case in which there is no delay, and lines L122 and L132 represent the results of a case in which there is a delay in the system (a case in which compensation is not made). Further, lines L123 and L133 represent the results of a case in which compensation has been made to advance in phase the movement of the pointer 22. In FIG. 19, when the displacement increases, the line L123 is located above and on the left side of the line L121. When the displacement decreases, the line L123 is located below and on the left side of the line L121. Also in FIG. 20, when the velocity increases, the line L133 is located above and on the left side of the line L131. When the velocity decreases, the line L133 is located below and on the left side of the line L131. It is therefore understood that the lines L123 and L133 are more advanced in phase than the line L121 and L131, respectively.

In FIGS. 21 and 22, lines L141 and L151 represent the results of a case in which there is no delay, and lines L142 and L152 represent the results of a case in which there is a delay (a case in which compensation is not made). Further, lines L143 and L153 represent the results of a case in which compensation has been made to eliminate the delay. In FIG. 21, when the displacement increases and decreases, the line L143 changes substantially along the line L141. Also in FIG. 22, when the velocity increases and decreases, the line L153 changes substantially along the line L151. It is therefore understood that appropriate compensation has been performed.

An experiment was conducted with a plurality of subjects. According to the evaluation of the subjects, the subjects had the least uncomfortable operational feeling in the case in which compensation was made to set the delay in response to be substantially zero, as illustrated in FIGS. 21 and 22, as compared with the cases illustrated in FIGS. 17 to 20.

2. Second Embodiment

Figure 23:
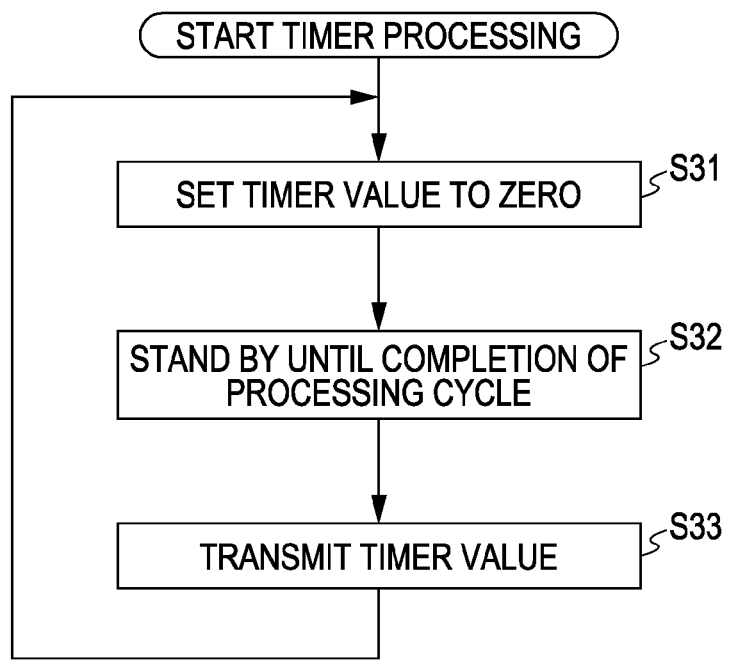
FIG. 23 is a flowchart explaining timer processing of a television receiver.
Figure 24:
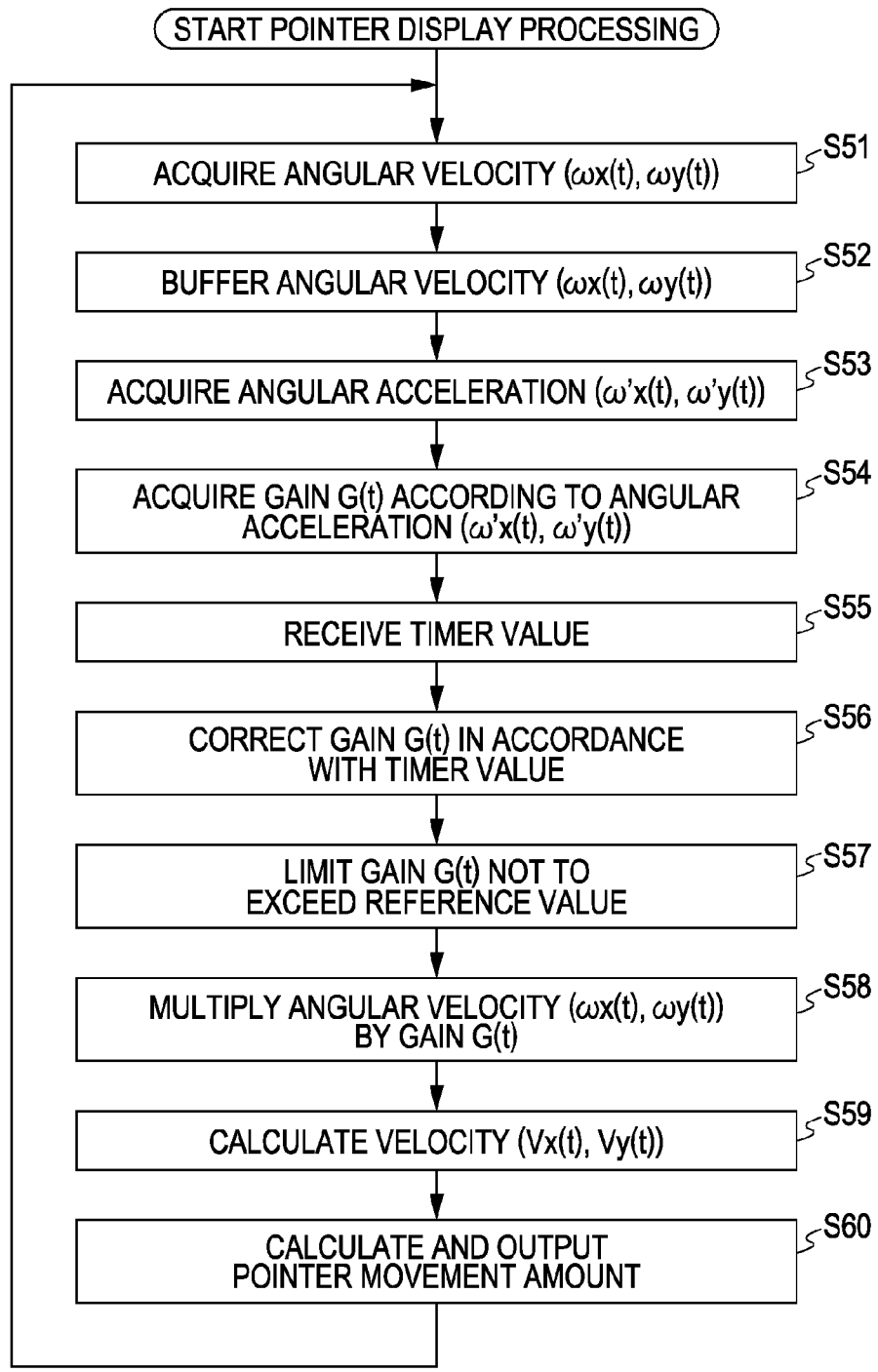
FIG. 24 is a flowchart explaining pointer display processing of the input device.

Operation of Television Receiver: The value of the gain G(t) can also be changed in accordance with the delay amount in the television receiver 10. FIGS. 23 and 24 illustrate the processing of the television receiver 10 and the processing of the input device 31, respectively, which are performed in this case.

The television receiver 10 performs the timer processing illustrated in FIG. 23.

At Step S31, the television receiver 10 sets the timer value to zero. At Step S32, the television receiver 10 stands by until the completion of a processing cycle. That is, upon completion of the processing cycle from the reception of the information of the pointer movement amount output from the input device 31 to the completion of the movement of the pointer 22 on the screen, the television receiver 10 at Step S33 transmits the timer value measured during the processing cycle. Thereafter, the processing returns to Step S31 to repeatedly perform similar processes.

That is, every time the processing cycle is completed, the television receiver 10 transmits to the input device 31 the timer value corresponding to the time taken for the processing of the processing cycle. In other words, the time taken for the television receiver 10 to perform the above-described processing varies, depending on the capability of the MPU 13 used in the television receiver 10 and on the state of the load on the MPU 13 during the processing and so forth. Therefore, the television receiver 10 measures the processing time by using a timer, and transmits the measured processing time to the input device 31.

Operation of Input Device: The longer the processing time is, the larger the delay amount is. Therefore, on the basis of the timer value received from the television receiver 10, the input device 31 controls the value of the gain G(t), as illustrated in the flowchart of FIG. 24.

The processes of Steps S51 to S60 in FIG. 24 are basically similar to the processes of Steps S1 to S9 in FIG. 9. In FIG. 24, however, the process of Step S5 in FIG. 9 of correcting the gain G(t) on the basis of the angular velocity is omitted. Alternatively, the process may not be omitted. If the correction process is not omitted, the gain G(t) is a function defined by the angular velocity and the angular acceleration. If the correction process is omitted, the gain G(t) is a function defined by the angular acceleration.

Further, in FIG. 24, a process of receiving the timer value is performed as Step S55 after the process of Step S54 corresponding to Step S4 in FIG. 9.

That is, after the angular velocity ($\omega x(t)$, $\omega y(t)$) is acquired at Step S51, the angular velocity ($\omega x(t)$, $\omega y(t)$) is temporarily buffered in the storage unit 202 at Step S52. At Step S53, the difference between the angular velocity of this time ($\omega x(t)$, $\omega y(t)$) and the stored angular velocity of the last time ($\omega x(t-1)$, $\omega y(t-1)$) (the difference between the angular velocity at one step and the angular velocity at the next step) is calculated, and thereby the angular acceleration ($\omega' x(t)$, $\omega' y(t)$) is calculated. That is, the angular velocity is differentiated, and the angular acceleration as the differential value is acquired. At Step S54, the gain G(t) according to the angular acceleration ($\omega' x(t)$, $\omega' y(t)$) is acquired.

At Step S55, the correction unit 212 receives the timer value transmitted from the television receiver 10 at Step S33 in FIG. 23. Specifically, the signal from the television receiver 10 is received by the communication unit 54 via the antenna 55, demodulated, and acquired by the correction unit 212. Then, at Step S56, the correction unit 212 corrects the gain G(t) in accordance with the timer value. Specifically, an operation with the following formula is performed.

In acceleration phase: $G(t)+\alpha$

In deceleration phase: $G(t)-\alpha$ (6)

In the above formula, a represents a positive value which increases as the timer value increases. The value a is calculated on the basis of a predetermined function, or is acquired from a mapped memory. Therefore, in the acceleration phase, the longer the delay is, the larger value the gain G(t) is corrected to. In the deceleration phase, the longer the delay is, the smaller value the gain G(t) is corrected to.

The subsequent processes of Steps S57 to S60 are similar to the processes of Steps S6 to S9 in FIG. 9. Description thereof is redundant, and thus will be omitted.

If the time taken for the processing increases, the delay amount increases proportionally thereto. Therefore, the gain G(t) is changed in accordance with the delay amount, as illustrated in the above formula (6). Thereby, the operational feeling can be further improved.

Also in this case, a part or all of the processes can be performed by the television receiver 10.

3. Third Embodiment

Figure 25:
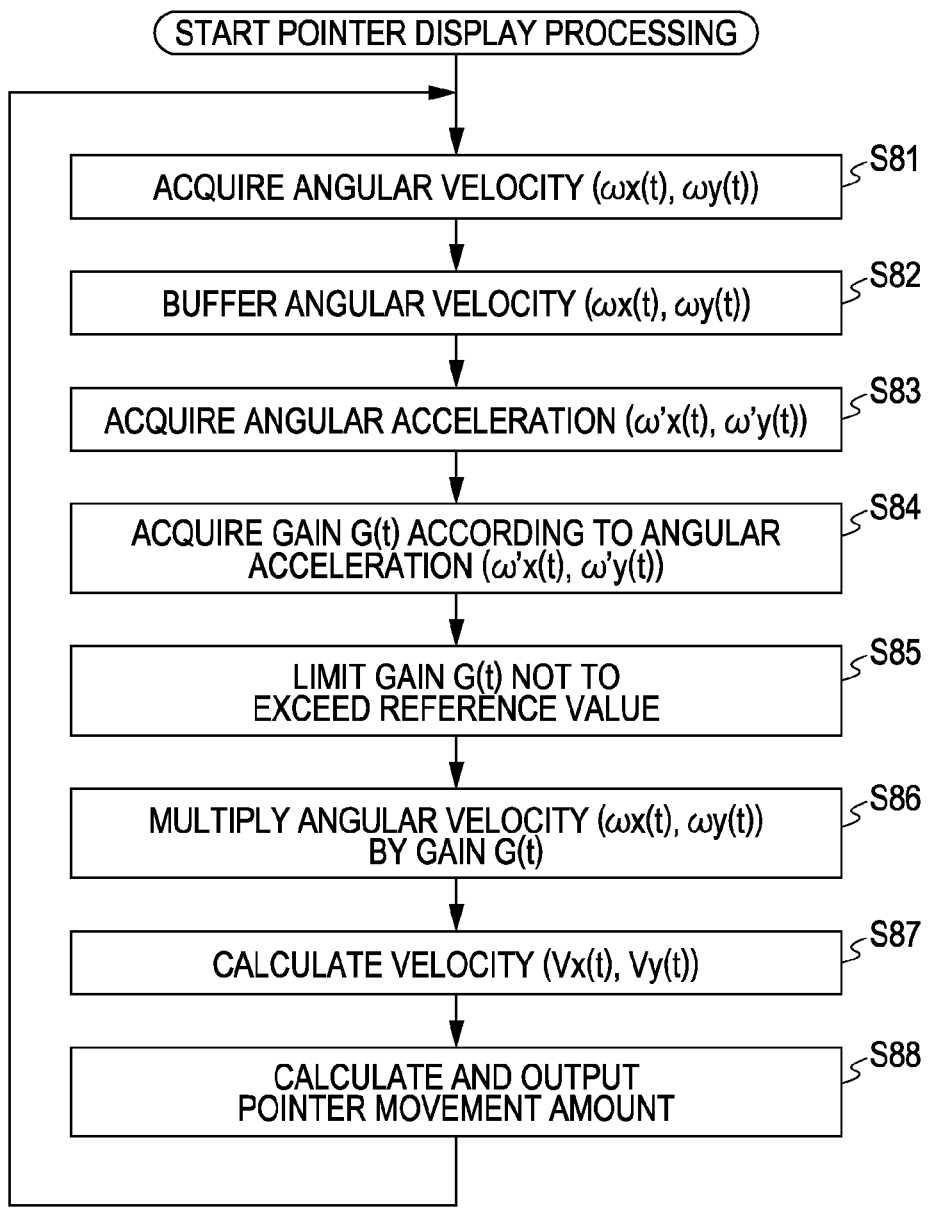
FIG. 25 is a flowchart explaining pointer display processing of the input device.

Operation of Input Device: In the embodiment of FIG. 9, the gain G(t) is determined on the basis of the velocity and the acceleration. Alternatively, the gain G(t) can be determined solely on the basis of the acceleration. FIG. 25 illustrates pointer display processing performed in this case.

At Step S81, the velocity acquisition unit 201 acquires the angular velocity ($\omega x(t)$, $\omega y(t)$) from the output of the angular velocity sensor 58. At Step S82, the angular velocity is temporarily stored by the storage unit 202. Then, at Step S83, the acceleration acquisition unit 203 calculates the difference between the angular velocity of this time ($\omega x(t)$, $\omega y(t)$) and the angular velocity of the last time ($\omega x(t-1)$, $\omega y(t-1)$) stored in the storage unit 202 (the difference between the angular velocity at one step and the angular velocity at the next step), to thereby acquire the angular acceleration ($\omega' x(t)$, $\omega' y(t)$). That is, the angular velocity is differentiated, and the angular acceleration as the differential value is acquired.

At Step S84, the gain acquisition unit 211 acquires the gain G(t) according to the angular acceleration ($\omega' x(t)$, $\omega' y(t)$). In the acceleration phase, the gain G(t) is a value larger than one. In the deceleration phase, the gain G(t) is a value smaller than one.

At Step S85, the limitation unit 213 limits the gain G(t) not to exceed the reference value.

At Step S86, the multiplication unit 214 multiplies the angular velocity ($\omega x(t)$, $\omega y(t)$) by the gain G(t) to calculate the corrected angular velocity ($\omega x1$, $\omega y1$). That is, the operation with the following formula is performed. This formula (7) is the same as the above-described formula (1).

$$\omega x1(t)=\omega x(t)\cdot G(t)$$

$$\omega y1(t)=\omega y(t)\cdot G(t) \quad (7)$$

At Step S87, the velocity operation unit 206 calculates the velocity (Vx(t), Vy(t)). That is, the velocity operation unit 206 divides the rate of change (a'x(t), a'y(t)) of the acceleration by the rate of change ($\omega''x(t)$, $\omega''y(t)$) of the angular acceleration, to thereby obtain the radius (Rx, Ry) of the motion of the input device 31 occurring when the user operates the input device 31.

Then, the velocity operation unit 206 multiplies the obtained radius (Rx, Ry) by the angular velocity to calculate the velocity (Vx(t), Vy(t)). As the angular velocity of this case, the corrected angular velocity ($\omega x1(t)$, $\omega y1(t)$), i.e., the angular velocity ($\omega x(t)$, $\omega y(t)$) multiplied by the gain G(t) is used.

At Step S88, the movement amount calculation unit 207 calculates the pointer movement amount by using the velocity (Vx(t), Vy(t)) calculated in the process of Step S87, and outputs the calculated pointer movement amount. The movement amount calculation unit 207 adds the velocity to the immediately preceding position coordinates of the pointer 22, to thereby calculate new position coordinates. That is, the displacement per unit time in the X-direction and the Y-direction of the input device 31 is converted into the displacement amount per unit time in the X-direction and the Y-direction of the pointer 22 displayed on the image display unit of the output unit 16. Thereby, the pointer movement amount is calculated such that the larger the gain G(t) is, i.e., the larger the correction amount of the angular velocity is, the larger the compensation amount of the delay in response is.

As described above, in this embodiment, the process at Step S5 in FIG. 9 of correcting the gain G(t) on the basis of the angular velocity ($\omega x(t)$, $\omega y(t)$) is not performed. That is, the gain G(t) is acquired and determined solely on the basis of the angular acceleration.

Also in this case, a part or all of the processes can be performed by the television receiver 10.

Figure 26:
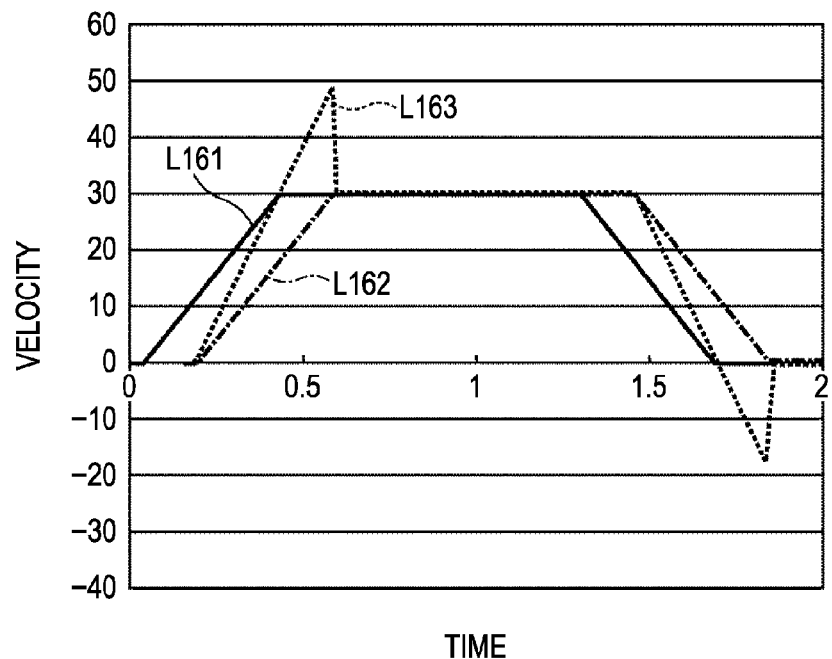
FIG. 26 is a diagram illustrating changes in velocity.
Figure 27:
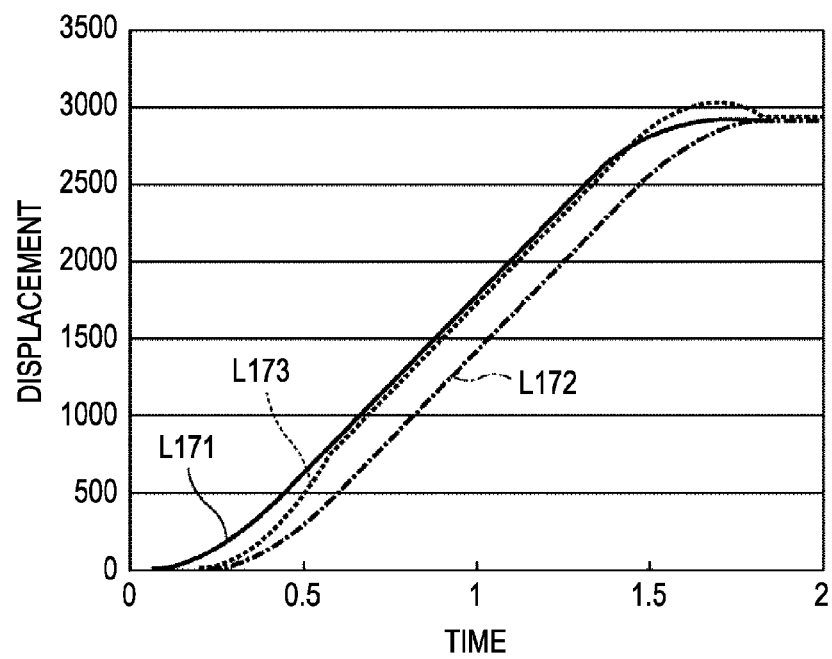
FIG. 27 is a diagram illustrating changes in displacement.

Characteristics of Input Device: FIGS. 26 and 27 illustrate changes in velocity and displacement occurring when the process of compensating for the delay is performed with the use of the gain G(t) determined solely on the basis of the acceleration, as illustrated in FIG. 25. FIG. 26 corresponds to FIG. 11, and FIG. 27 corresponds to FIG. 12.

Lines L161, L162, and L163 in FIG. 26 correspond to the lines L1, L2, and L3 in FIG. 11, respectively. At the start of the movement, the line L163 representing the compensated velocity starts at a start point substantially the same as the start point of the line L162 representing the delayed velocity, and increases at a constant rate with a slope steeper than the slope of the line L161 (therefore, the line L162) to reach a velocity of approximately 50. Then, the line L163 decreases with a steep slope to fall to the velocity of 30. Thereafter, the line L163 remains at the constant velocity of 30 for a predetermined time. Then, when the movement is completed, the line L163 representing the compensated velocity starts to decrease at a point substantially the same as the point at which the line L162 representing the delayed velocity starts to decrease, and decreases at a constant rate with a slope steeper than the slope of the line L161 to fall to a velocity of approximately −17. Further, the line L163 increases with a steep slope to reach the velocity of 0.

Lines L171, L172, and L173 in FIG. 27 correspond to the lines L11, L12, and L13 in FIG. 12, respectively. At the start of the movement, the line L173 starts to be displaced at a start point substantially the same as the start point of the line L172, and swiftly reaches a value close to the line L171. Thereafter, the line L173 gradually increases at a constant rate with a slope substantially similar to the slope of the line L171 (therefore, the line L172). The line L173 is higher than the line L172 but slightly lower than the line L171. That is, in FIG. 27, the line L173 is higher than the line L172 and close to and lower than the line L171. As described above, the line L173 is a line having a characteristic resembling the characteristic of the line L171, and compensating for the delay of the line L172.

Immediately before reaching the displacement of approximately 2900, the line L173 exceeds the line L171 (i.e., in FIG. 27, the line L173 is located slightly above the line L171), and thereafter converges to the constant value of 2900. As described above, the line L173 is a line having a characteristic resembling the characteristic of the line L171, and compensating for the delay of the line L172.

As obvious from the comparison of FIG. 26 with FIG. 11, however, the time taken for the line L163 to move to the vicinity of the line L161 in the acceleration and deceleration phases is longer than in FIG. 11.

Further, as obvious from the comparison of FIG. 27 with FIG. 12, immediately after the start of the movement, the time taken for the line L173 to move to the vicinity of the line L171 is longer than in FIG. 12, and the distance between the lines L173 and L171 is longer than in FIG. 12. Also, at the start of the stopping operation, the time taken for the line L173 to move to the vicinity of the line L171 is longer than in FIG. 12, and the distance between the lines L173 and L171 is longer than in FIG. 12.

Figure 28:
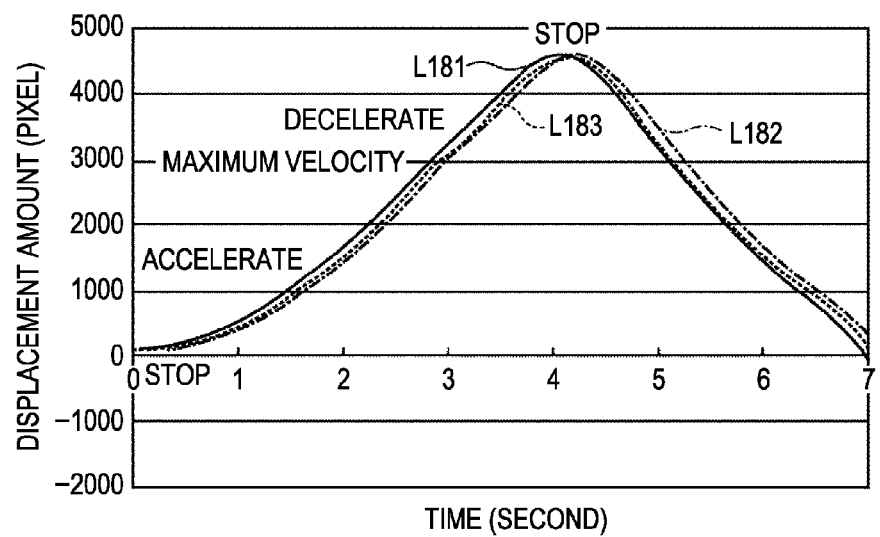
FIG. 28 is a diagram illustrating changes in displacement.
Figure 29:
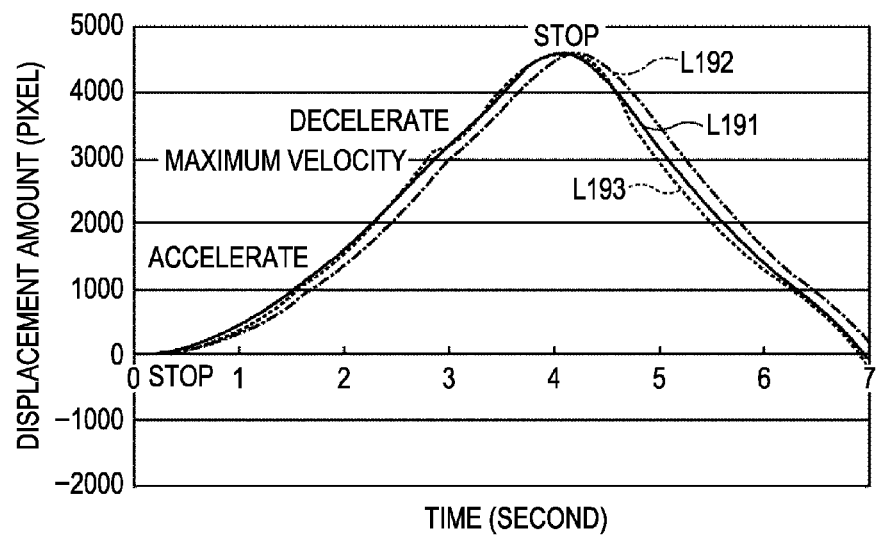
FIG. 29 is a diagram illustrating changes in displacement.

FIGS. 28 and 29 illustrate the results of an operation of moving the pointer 22 in a predetermined direction and thereafter moving the pointer 22 back to the opposite direction by using the gain G(t) determined solely on the basis of the acceleration. Lines L181 and L191 represent the results of a case in which there is no delay, and lines L182 and L192 represent the results of a case in which there is a delay (a case in which compensation is not made). Further, lines L183 and L193 represent the results of a case in which compensation has been made to set the delay to be substantially zero.

FIG. 28 illustrates the result of a case in which the delay in a high-velocity region has been compensated for. According to the evaluation of the subjects in this case, the delay was unnoticed when the velocity was high but noticed when the velocity was low.

FIG. 29 illustrates the result of a case in which the delay in a low-velocity region has been compensated for. According to the evaluation of the subjects in this case, the delay was unnoticed when the velocity was low but noticed when the velocity was high.

Figure 30:
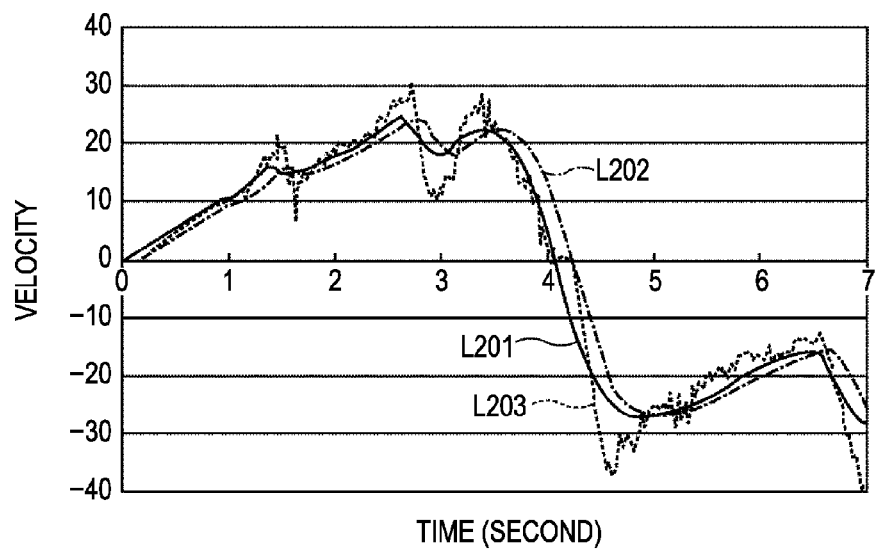
FIG. 30 is a diagram illustrating changes in velocity.

FIG. 30 illustrates changes in velocity occurring in the operation of moving the pointer 22 in a predetermined direction and thereafter moving the pointer 22 back to the opposite direction by using the gain G(t) determined solely on the basis of the acceleration. A line L201 represents the result of a case in which there is no delay, and a line L202 represents the result of a case in which there is a delay (a case in which compensation is not made). Further, a line L203 represents the result of a case in which compensation has been made to set the delay to be substantially zero.

According to the evaluation of the subjects in this case, the subjects felt that the delay was substantially compensated for, but had uncomfortable feeling about the sensitivity of the pointer 22 at the start and end of the movement thereof. That is, when the user operates the input device 31, excessive acceleration of the pointer 22 abruptly starts with a delay of one beat. Also in the stopping operation, the pointer 22 rapidly decelerates and stops. As a result, the user feels unnaturalness.

As described above, an evaluation of the subjects was obtained, according to which the delay of the movement of the pointer 22 is compensated for to a certain degree, although not sufficiently. However, another evaluation was obtained, according to which the velocity profile deviates from the reality and the input device 31 arbitrarily performs unnatural acceleration and deceleration, i.e., very artificial compensation is made. Therefore, it is preferable to determine the gain G(t) both on the basis of the acceleration and the velocity, not solely on the basis of the acceleration.

4. Fourth Embodiment

Figure 31:
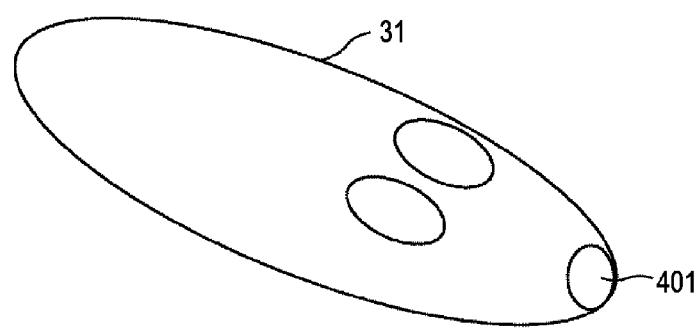
FIG. 31 is a diagram illustrating a configuration of another embodiment of the input device.

Configuration of Input Device: In the above, the angular velocity sensor 58 and the acceleration sensor 59 are used as the sensor. Alternatively, an image sensor can also be used. FIG. 31 illustrates a configuration of this case.

In this embodiment, a leading end of the input device 31 is attached with an image sensor 401, such as a CMOS (Complementary Metal Oxide Semiconductor). The user operates the input device 31 to have the image sensor 401 pick up the image in the direction in which the image sensor 401 is oriented. With the current coordinates (X1, Y1) of the image picked up by the image sensor 401 and the coordinates (X2, Y2) preceding the current coordinates by a time Δt, the velocity (Vx, Vy) is calculated in accordance with the following formula.

$$Vx=(X1-X2)/\Delta t$$

$$Vy=(Y1-Y2)/\Delta t \tag{8}$$

Subsequently, with the use of this velocity, the compensation process can be performed in a similar manner as in the above-described case.

5. Fifth Embodiment

Figure 32:
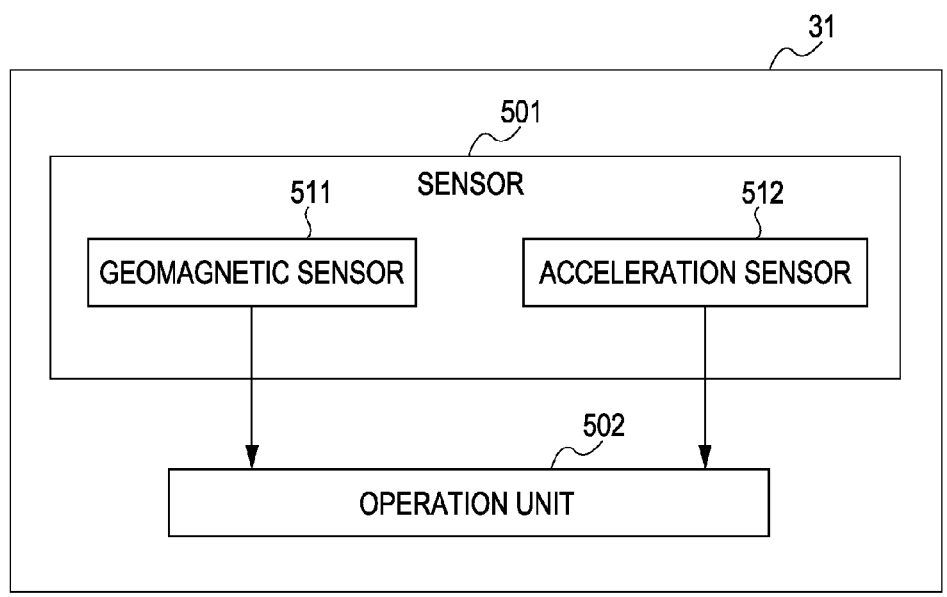
FIG. 32 is a diagram illustrating a configuration of another embodiment of the input device.

Configuration of Input Device: Further, a geomagnetic sensor can be used as the sensor. FIG. 32 illustrates an embodiment of this case.

In this embodiment, the input device 31 includes a sensor 501 and an operation unit 502. The sensor 501 includes a geomagnetic sensor 511 and an acceleration sensor 512.

The user moves the input device 31 in an arbitrary direction. When the input device 31 is operated, the geomagnetic sensor 511 detects the absolute angle (direction) of the operated input device 31. In a similar manner as illustrated in the formula (8) (wherein the coordinate values are replaced by angle values), the operation unit 502 divides the difference between two temporally adjacent angles by the time therebetween to calculate the angular velocity.

Subsequently, with the use of this angular velocity, the compensation process can be performed in a similar manner as in the above-described case.

On the basis of the detection output from the acceleration sensor 512, the operation unit 502 calculates a pitch angle and a roll angle. Then, on the basis of the calculated angles, the operation unit 502 compensates for the slope to correct the position coordinates to more accurate values. In this process, a commonly used slope compensation algorithm can be used.

6. Sixth Embodiment

Figure 33:
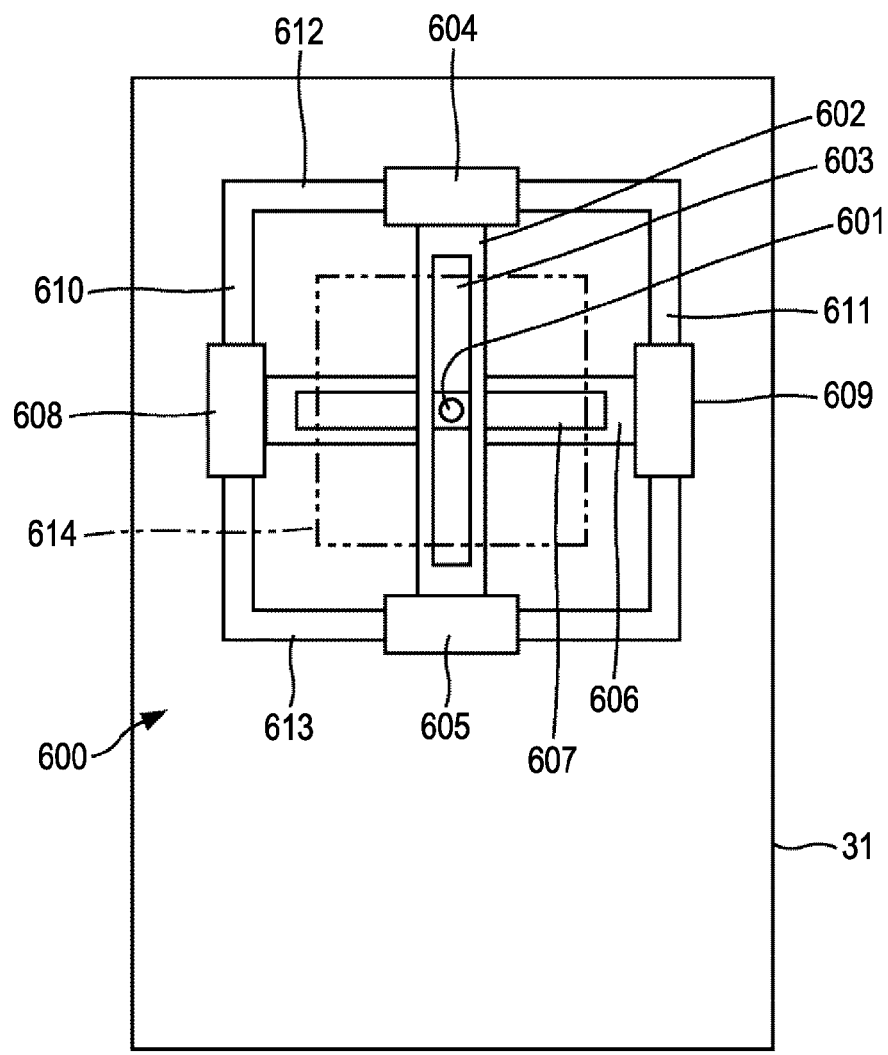
FIG. 33 is a diagram illustrating a configuration of another embodiment of the input device.

Configuration of Input Device: Further, a variable resistor can also be used as the sensor. FIG. 33 illustrates an embodiment of this case.

In this embodiment, the input device 31 includes a variable resistor 600 as the sensor. In the variable resistor 600, slide portions 604 and 605 are guided by rod-like resistors 612 and 613, respectively, which are disposed in the horizontal direction in the drawing (the X-axis direction). Thereby, the slide portions 604 and 605 are slidable in the horizontal direction. Similarly, slide portions 608 and 609 are guided by rod-like resistors 610 and 611, respectively, which are disposed in the vertical direction in the drawing (the Y-axis direction). Thereby, the slide portions 608 and 609 are slidable in the vertical direction in the drawing (the Y-axis direction).

A bar 602 attached with the slide portions 604 and 605 at end portions thereof is formed with a groove 603. A bar 606 attached with the slide portions 608 and 609 at end portions thereof is formed with a groove 607. In the grooves 603 and 607, an operation unit 601 is slidably disposed.

Therefore, when the user moves the operation unit 601 in an arbitrary direction within a frame 614, the resistance value in the X-direction and the resistance value in the Y-direction at the position of the operation unit 601 are changed. These resistance values represent the coordinates in the X-direction and the Y-direction in the frame 614. Therefore, in a similar manner as illustrated in the formula (8), the difference between two coordinate points is divided by the time. Thereby, the velocity can be obtained.

Subsequently, with the use of this velocity, the compensation process can be performed in a similar manner as in the above-described case.

In the input device 31 of FIG. 33, the mass of the operation unit 601 may be increased such that, when the entire input device 31 is tilted in a predetermined direction, the operation unit 601 is moved within the frame 614. Alternatively, the operation unit 601 may be operated by the user with his finger.

7. Seventh Embodiment

Figure 34:
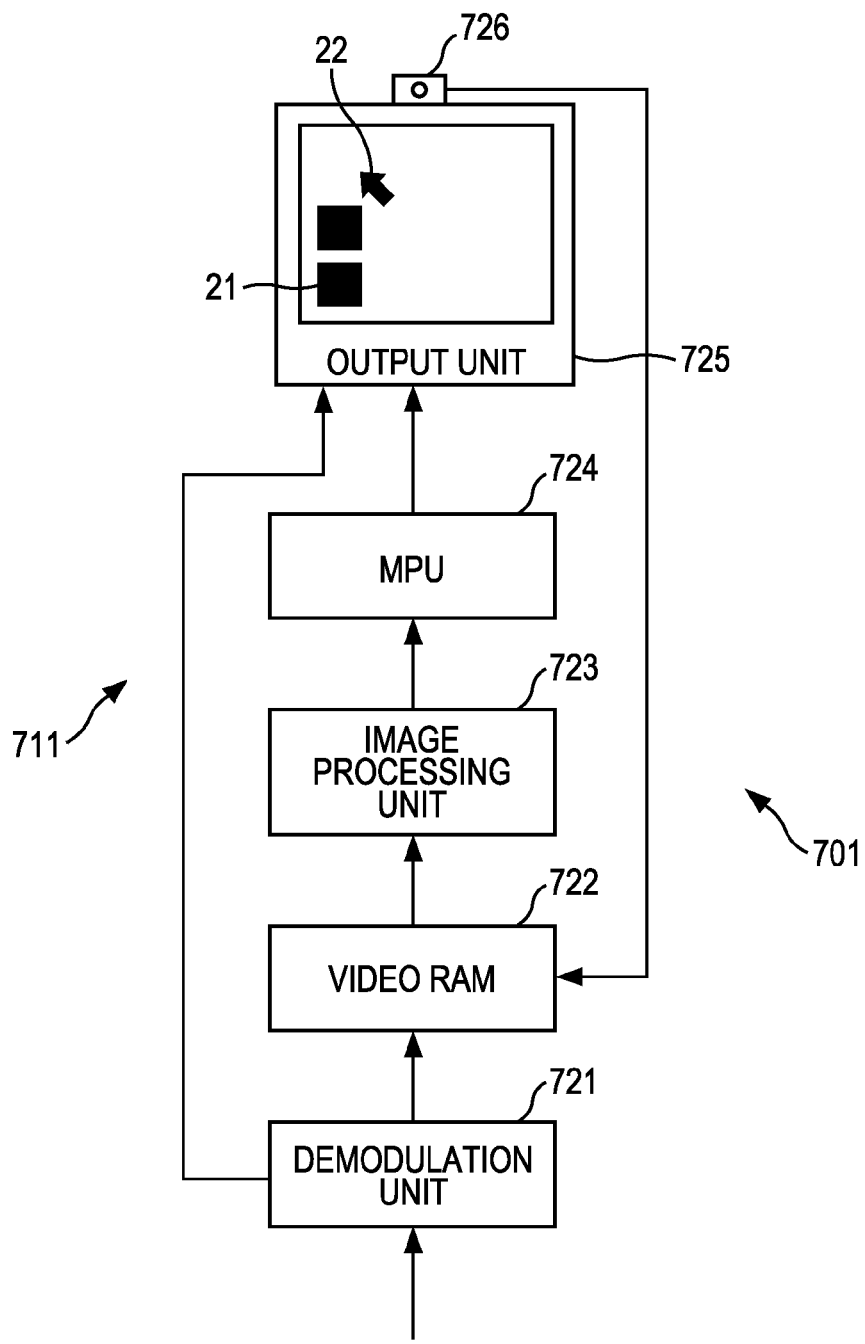
FIG. 34 is a block diagram illustrating a configuration of an input system according to another embodiment of the present invention.

Configuration of Input System: FIG. 34 illustrates a configuration of an input system according to another embodiment of the present invention.

In an input system 701 of FIG. 34, the operation by the user using a gesture with his hand or finger is detected, and thereby a command is input.

A television receiver 711 of the input system 701 includes a demodulation unit 721, a video RAM 722, an image processing unit 723, an MPU 724, and an output unit 725. Further, an upper portion of the television receiver 711 is attached with an image sensor 726.

The demodulation unit 721 demodulates a television broadcasting signal received via a not-illustrated antenna, and outputs a video signal and an audio signal to the video RAM 722 and the output unit 725, respectively. The video RAM 722 stores the video signal supplied from the demodulation unit 721, and stores the image picked up by the image sensor 726. From the image of the user stored in the video RAM 722, the image processing unit 723 detects the gesture with a hand or finger (which corresponds to the operation unit of the input device 31, and thus will be hereinafter referred to also as the operation unit), and assigns a command to the gesture. This function can be realized by commonly used techniques, such as the techniques of Japanese Unexamined Patent Application Publication Nos. 59-132079 and 10-207618, for example.

The image processing unit 723 detects the gesture of the operation unit of the user picked up by the image sensor 726. In this embodiment, therefore, a part of the configuration of the television receiver 711 functioning as an electronic device constitutes an input device. The image processing unit 723 outputs the coordinates of the pointer 22 or the like to the MPU 724. On the basis of the input coordinates, the MPU 724 controls the display position of the pointer 22 displayed on the output unit 725.

The image processing unit 723 and the MPU 724 can be integrally configured.

The output unit 725 includes an image display unit and an audio output unit. The image sensor 726 functioning as a detection unit picks up the image of the operation unit, which is at least a part of the body of the user performing a gesture motion while viewing the image displayed on the image display unit of the output unit 725.

Figure 35:
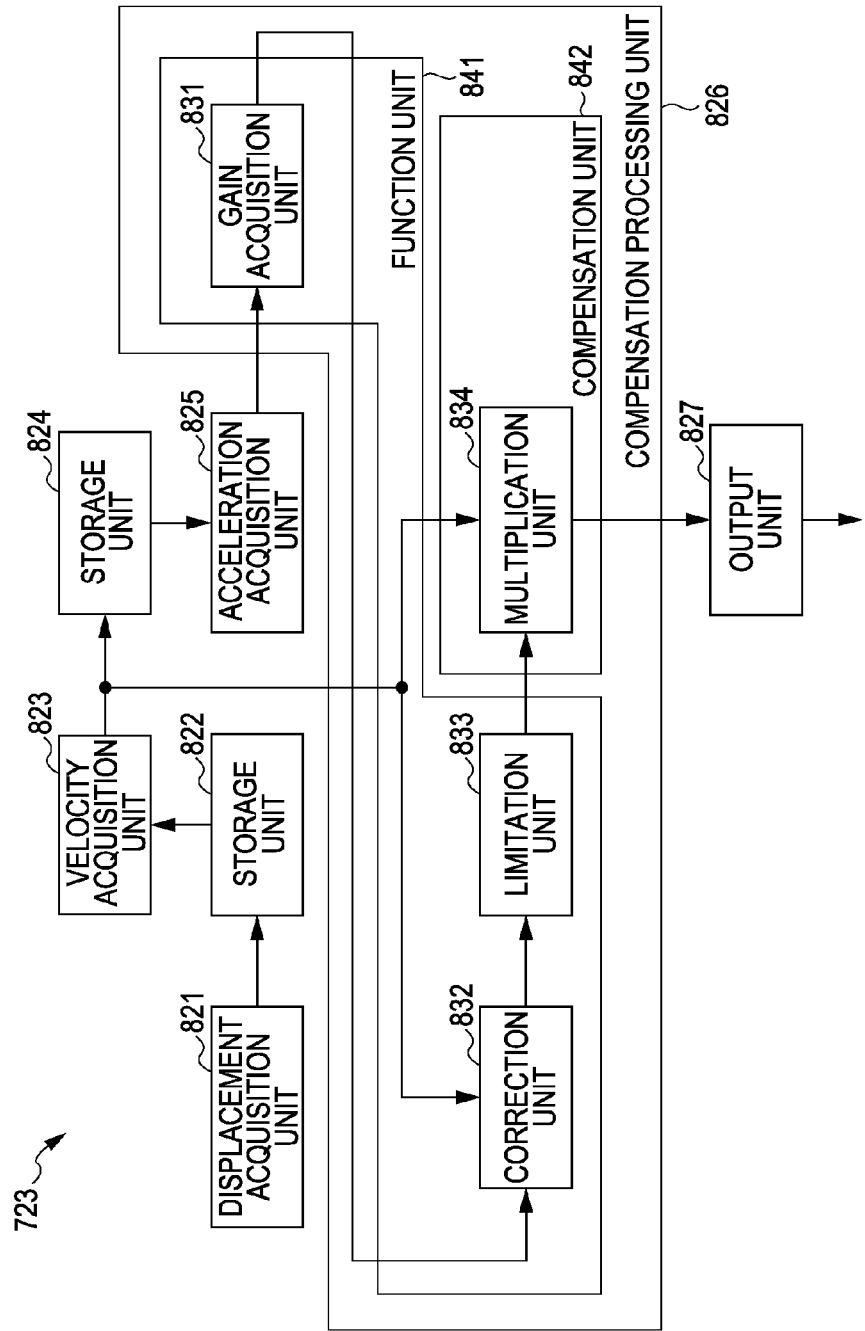
FIG. 35 is a block diagram illustrating a functional configuration of an image processing unit.

Functional Configuration of Image Processing Unit: FIG. 35 illustrates a functional configuration of the image processing unit 723 which operates in accordance with a program stored in an internal memory thereof. The image processing unit 723 includes a displacement acquisition unit 821, a storage unit 822, a velocity acquisition unit 823, a storage unit 824, an acceleration acquisition unit 825, a compensation processing unit 826, and an output unit 827.

The displacement acquisition unit 821 acquires the displacement of the operation unit of the user stored in the video RAM 722. The storage unit 822 stores the displacement acquired by the displacement acquisition unit 821. The velocity acquisition unit 823 calculates the difference between the displacement at one step and the displacement at the next step stored in the storage unit 822, to thereby calculate a velocity signal. That is, the displacement is differentiated to acquire the velocity as the operation signal. The storage unit 824 stores the velocity acquired by the velocity acquisition unit 823. The acceleration acquisition unit 825 calculates the difference between the velocity signal at one step and the velocity signal at the next step stored in the storage unit 824, to thereby calculate an acceleration signal. That is, the velocity as the operation signal is differentiated to acquire the acceleration as the differential value of the velocity. In this embodiment, the velocity acquisition unit 823 and the acceleration acquisition unit 825 constitute a first acquisition unit.

The compensation processing unit 826 generates a gain G(t) defined by the acceleration as the differential value acquired by the acceleration acquisition unit 825. Alternatively, the compensation processing unit 826 generates a gain G(t) defined by the velocity as the operation signal acquired by the velocity acquisition unit 823 and the acceleration as the differential value acquired by the acceleration acquisition unit 825. Then, the compensation processing unit 826 multiplies the velocity as the operation signal by the generated gain G(t). That is, the velocity as the operation signal is corrected.

The compensation processing unit 826 includes a function unit 841 and a compensation unit 842. The function unit 841 includes a gain acquisition unit 831, a correction unit 832, and a limitation unit 833. The compensation unit 842 includes a multiplication unit 834.

The gain acquisition unit 831 acquires the gain G(t) defined by the acceleration as the differential value acquired by the acceleration acquisition unit 825. On the basis of the velocity as the operation signal acquired by the velocity acquisition unit 823, the correction unit 832 corrects the gain G(t) as appropriate. The limitation unit 833 limits the uncorrected gain G(t) or the corrected gain G(t) not to exceed a threshold value. The multiplication unit 834 multiplies the velocity as the operation signal acquired by the velocity acquisition unit 823 by the gain G(t), which is a function limited by the limitation unit 833, to thereby correct the velocity as the operation signal and compensate for the delay.

On the basis of the velocity as the operation signal compensated by the multiplication unit 834, the output unit 827 calculates the coordinates of the pointer 22, and outputs the calculated coordinates.

Operation of Television Receiver: Subsequently, with reference to FIG. 36, pointer display processing of the television receiver 711 will be described. This processing is performed when the user operates the operation unit in an arbitrary predetermined direction, i.e., when the entire operation unit is moved in an arbitrary direction in a three-dimensional free space to move the pointer 22 displayed on the output unit 725 of the television receiver 711 in a predetermined direction. This processing is performed to generate, in the television receiver 711 which practically includes therein (i.e., is integrated with) the input device, the operation signal for controlling the display on the screen of the television receiver 711.

At Step S101, the displacement acquisition unit 821 acquires a displacement (x(t), y(t)). Specifically, the image of the operation unit of the user is picked up by the image sensor 726 and stored in the video RAM 722. The displacement acquisition unit 821 acquires the coordinates of the operation unit from this image.

At Step S102, the storage unit 822 buffers the acquired displacement (x(t), y(t)). At Step S103, the velocity acquisition unit 823 acquires a velocity (x'(t), y'(t)). Specifically, the velocity acquisition unit 823 divides the difference between the displacement (x(t), y(t)) of this time and the displacement (x(t−1), y(t−1)) stored the last time in the storage unit 822 by the time therebetween, to thereby calculate the velocity (x'(t), y'(t)) as the operation signal. That is, the differential value is calculated.

At Step S104, the storage unit 824 buffers the acquired velocity (x'(t), y'(t)). At Step S105, the acceleration acquisition unit 825 acquires an acceleration (x''(t), y''(t)). Specifically, the acceleration acquisition unit 825 divides the difference between the velocity (x'(t), y'(t)) of this time and the velocity (x'(t−1), y'(t−1)) stored the last time in the storage unit 824 by the time therebetween, to thereby calculate the acceleration (x''(t), y'' (t)) as the differential value. That is, the differential value of the operation signal is acquired.

Then, at Steps S106 to S109, on the basis of the velocity acquired as the operation signal and the acceleration as the differential value of the velocity, the compensation processing unit 826 performs an operation for compensating for the delay in response of the operation signal.

That is, at Step S106, the gain acquisition unit 831 acquires the gain G(t) defined by the acceleration (x''(t), y''(t)) acquired at Step S105. This gain G(t) as a function is multiplied by the velocity as the operation signal at Step S109 described later. Therefore, a gain G(t) value of 1 serves as a reference value. When the gain G(t) is larger than the reference value, the velocity is corrected to be increased. When the gain G(t) is smaller than the reference value, the velocity is corrected to be reduced.

In the acceleration phase (i.e., when the acceleration is positive), the gain G(t) is a value equal to or larger than the reference value (equal to or larger than the value of 1). In the deceleration phase (i.e., when the acceleration is negative), the gain G(t) is a value smaller than the reference value (smaller than the value of 1). Further, the larger the absolute value of the acceleration is, the larger the difference between the absolute value of the gain G(t) and the reference value (the value of 1) is.

The gain G(t) may be acquired by performing an operation or by reading the gain G(t) from a previously mapped table. Further, the gain G(t) may be obtained separately for the X-direction and the Y-direction. Alternatively, the larger one of the respective absolute values of the two values may be selected as a representative value, for example, to obtain a single gain G(t).

At Step S107, the correction unit 832 corrects the gain G(t) on the basis of the velocity (x'(t), y'(t)) acquired by the velocity acquisition unit 823. Specifically, the gain G(t) is corrected such that the larger the velocity (x'(t), y'(t)) is, the closer to the reference value (the value of 1) the gain G(t) is.

Also in this case, the corrected value may be obtained separately for the X-direction and the Y-direction, or the larger one of the respective absolute values of the two values may be selected as a representative value, for example, to obtain a single corrected value.

This correction process can be omitted. If the correction process is not omitted, the gain G(t) is a function defined by the velocity and the acceleration. If the correction process is omitted, the gain G(t) is a function defined by the acceleration.

At Step S108, the limitation unit 833 limits the gain G(t) not to exceed the threshold value. That is, the corrected gain G(t) is limited to be within the range of the predetermined threshold value. In other words, the threshold value is set to be the maximum or minimum value, and the absolute value of the gain G(t) is limited not to exceed the threshold value. If the operation unit of the user is vibrated, therefore, a situation is suppressed in which the absolute value of the gain G(t) is too small to compensate for the delay or too large to prevent oscillation.

The processes of Steps S106 to S108 can be performed by a single reading process, if the gain G(t) has previously been mapped in the gain acquisition unit 831 to satisfy the conditions of the respective steps.

At Step S109, the multiplication unit 834 constituting the compensation unit 842 multiplies the velocity (x'(t), y'(t)) as the operation signal by the gain G(t). That is, the velocity is multiplied by the gain G(t) as a coefficient, and thereby the corrected velocity (x'1(t), y'1(t)) is generated. For example, if the gain G(t) is used as the representative value integrating the value in the X-axis direction and the value in the Y-axis direction, the corrected velocity (x'1(t), y'1(t)) is calculated with the following formula.

$$x'1(t)=x'(t) \cdot G(t)$$

$$y'1(t)=y'(t) \cdot G(t) \tag{9}$$

At Step S110, the output unit 827 calculates the coordinates on the basis of the corrected velocity (x'1(t), y'1(t)), and outputs the calculated coordinates. The output unit 827 adds the velocity to the immediately preceding position coordinates of the pointer 22 to calculate new position coordinates. That is, the displacement per unit time in the X-direction and the Y-direction of the operation unit of the user is converted into the displacement amount per unit time in the X-direction and the Y-direction of the pointer 22 displayed on the image display unit of the output unit 725. Thereby, the pointer movement amount is calculated such that the larger the gain G(t) is, i.e., the larger the correction amount of the velocity is, the larger the compensation amount of the delay in response is. That is, as the gain G(t) is increased, the delay between the operation of the operation unit and the movement of the pointer 22 is reduced. If the value of the gain G(t) is further increased, the movement of the pointer 22 is more advanced in phase than the operation of the operation unit.

Further, the processes performed here include a process of removing a hand-shake component of the operation unit through a low-pass filter, and a process of, when the operation velocity is low (a low velocity and a low acceleration), setting an extremely low moving velocity of the pointer 22 to make it easy to stop the pointer 22 on the icon 21.

The above-described processes are repeatedly performed during the operation of the operation unit.

As described above, in this embodiment, the gain G(t) is determined in accordance with the velocity as the operation signal and the acceleration as the differential value of the velocity.

8. Eighth Embodiment

Figure 37:
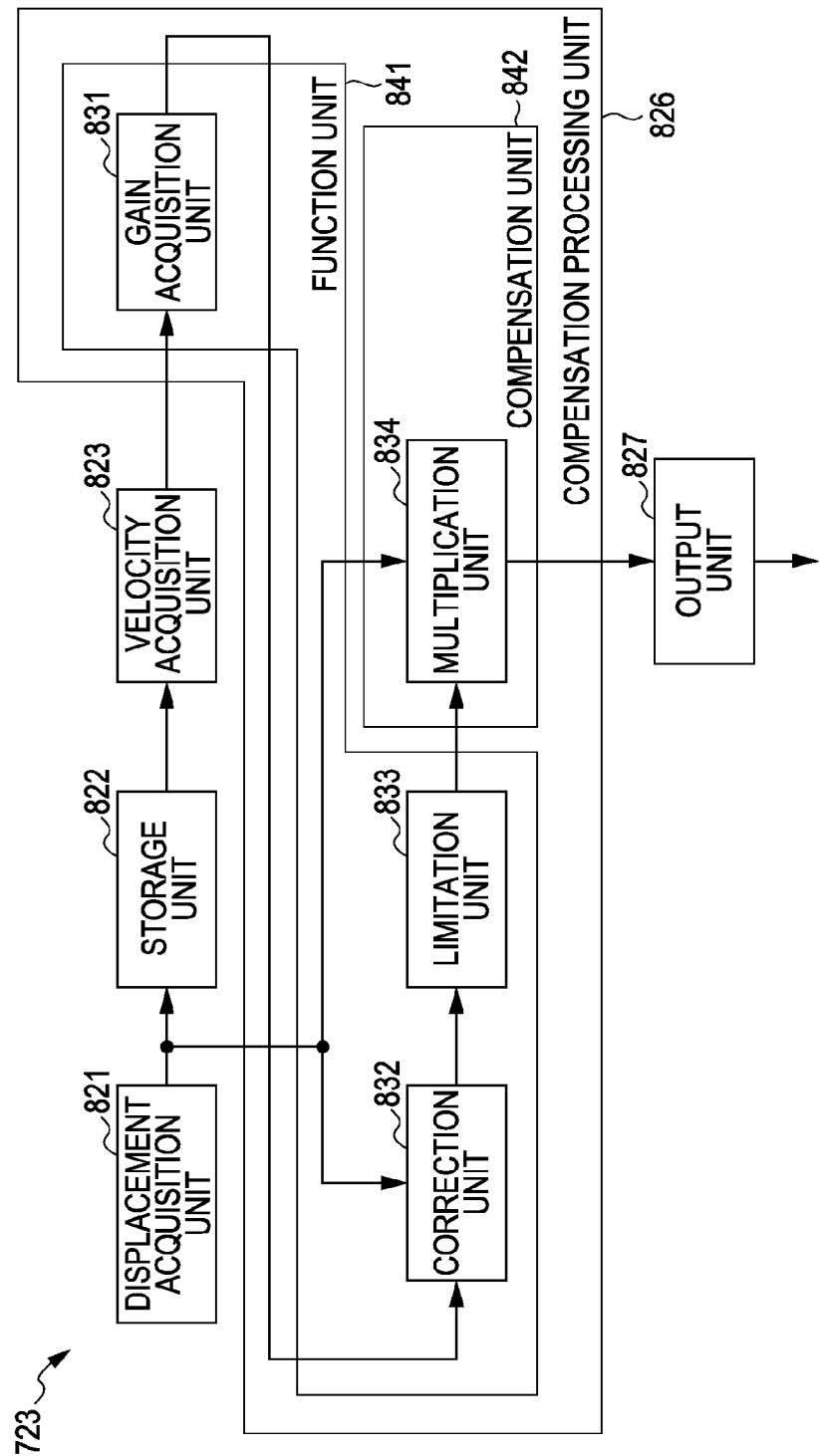
FIG. 37 is a block diagram illustrating another functional configuration of the image processing unit.
Figure 38:
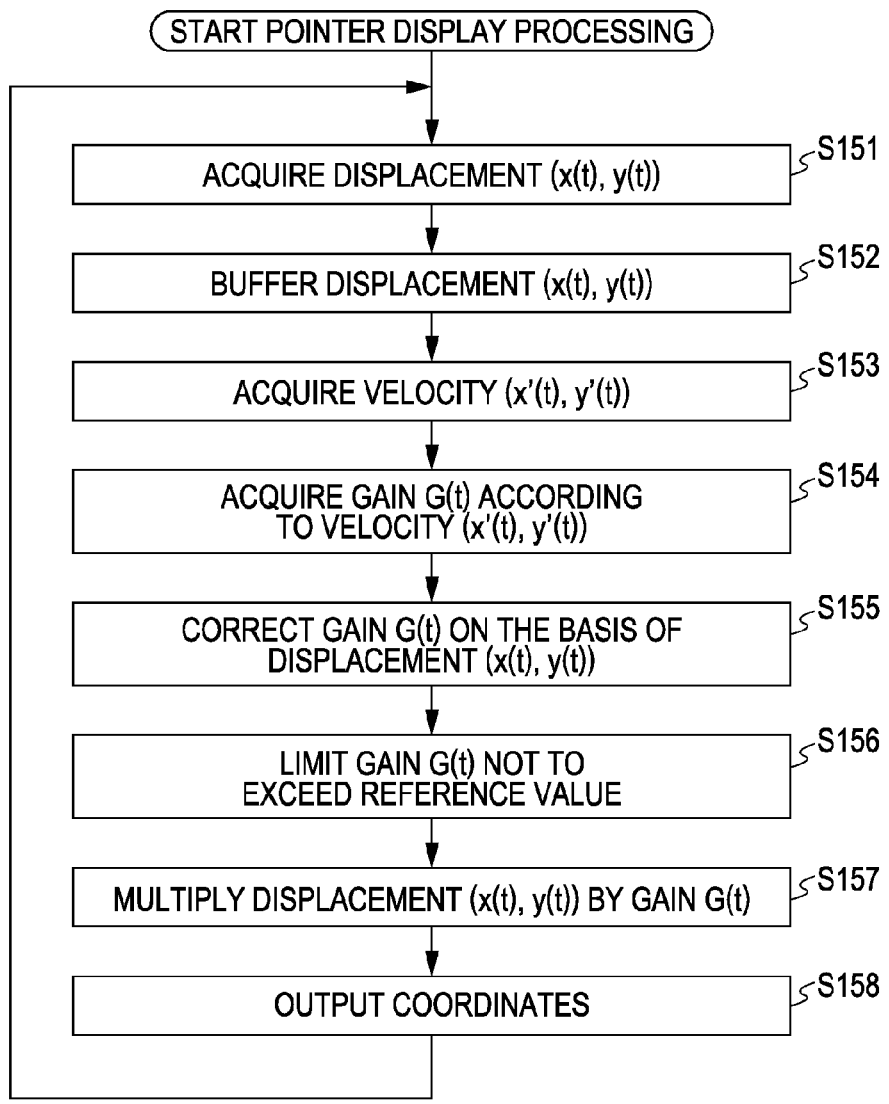
FIG. 38 is a flowchart explaining pointer display processing of the television receiver.

Functional Configuration of Image Processing Unit: The gain G(t) can also be determined in accordance with the displacement as the operation signal and the velocity as the differential value of the displacement. With reference to FIGS. 37 and 38, an embodiment of this case will be described.

FIG. 37 is a block diagram illustrating a functional configuration of the image processing unit 723 in this case.

In the image processing unit 723 of FIG. 37, the storage unit 824 and the acceleration acquisition unit 825 of FIG. 35 are omitted, and the output from the velocity acquisition unit 823 is directly supplied to the gain acquisition unit 831. Further, the correction unit 832 and the multiplication unit 834 are supplied with the displacement acquired by the displacement acquisition unit 821 in place of the velocity acquired by the velocity acquisition unit 823. The other parts of the configuration of the image processing unit 723 in FIG. 37 are similar to the corresponding parts in FIG. 35. Description thereof is redundant, and thus will be omitted. In this embodiment, the displacement acquisition unit 821 and the velocity acquisition unit 823 constitute a first acquisition unit.

Operation of Television Receiver: Subsequently, with reference to FIG. 38, pointer display processing of the television receiver 711 will be described. This processing is performed when the user operates the operation unit in an arbitrary predetermined direction, i.e., when the entire operation unit is moved in an arbitrary direction in a three-dimensional free space to move the pointer 22 displayed on the output unit 725 of the television receiver 711 in a predetermined direction. This processing is also performed to generate, in the television receiver 711 which practically includes therein (i.e., is integrated with) the input device, the operation signal for controlling the display on the screen of the television receiver 711.

At Step S151, the displacement acquisition unit 821 acquires a displacement (x(t), y(t)). Specifically, the image of the operation unit of the user is picked up by the image sensor 726 and stored in the video RAM 722. The displacement acquisition unit 821 acquires the coordinates of the operation unit from this image.

At Step S152, the storage unit 822 buffers the acquired displacement (x(t), y(t)). At Step S153, the velocity acquisition unit 823 acquires a velocity (x'(t), y'(t)). Specifically, the velocity acquisition unit 823 divides the difference between the displacement (x(t), y(t)) of this time and the displacement (x(t−1), y(t−1)) stored the last time in the storage unit 822 by the time therebetween, to thereby calculate the velocity (x'(t), y'(t)). That is, the velocity (x'(t), y'(t)) as the differential value of the displacement (x(t), y(t)) as the operation signal is acquired.

Then, at Steps S154 to S157, the compensation processing unit 826 performs an operation for compensating for the delay in response of the operation signal on the basis of the acquired displacement and velocity.

That is, at Step S154, the gain acquisition unit 831 acquires the gain G(t) according to the velocity (x'(t), y'(t)) acquired at Step S153. This gain G(t) as a function is multiplied by the displacement at Step S157 described later. Therefore, a gain G(t) value of 1 serves as a reference value. When the gain G(t) is larger than the reference value, the displacement as the operation signal is corrected to be increased. When the gain G(t) is smaller than the reference value, the displacement is corrected to be reduced.

When the velocity is positive (e.g., when the operation unit moves in the left direction (or the upper direction)), the gain G(t) is a value equal to or larger than the reference value (equal to or larger than the value of 1). When the velocity is negative (e.g., when the operation unit moves in the right direction (or the lower direction)), the gain G(t) is a value smaller than the reference value (smaller than the value of 1). Further, the larger the absolute value of the velocity is, the larger the difference between the absolute value of the gain G(t) and the reference value (the value of 1) is.

The gain G(t) may be acquired by performing an operation or by reading the gain G(t) from a previously mapped table. Further, the gain G(t) may be obtained separately for the X-direction and the Y-direction. Alternatively, the larger one of the respective absolute values of the two values may be selected as a representative value, for example, to obtain a single gain G(t).

At Step S155, the correction unit 832 corrects the gain G(t) on the basis of the displacement (x(t), y(t)) as the operation signal acquired by the displacement acquisition unit 821. Specifically, the gain G(t) is corrected such that the larger the displacement (x(t), y(t)) is, the closer to the reference value (the value of 1) the gain G(t) is.

Also in this case, the corrected value may be obtained separately for the X-direction and the Y-direction, or the larger one of the respective absolute values of the two values may be selected as a representative value, for example, to obtain a single corrected value.

This correction process can be omitted. If the correction process is not omitted, the gain G(t) is a function defined by the displacement and the velocity. If the correction process is omitted, the gain G(t) is a function defined by the velocity.

At Step S156, the limitation unit 833 limits the gain G(t) not to exceed the threshold value. That is, the corrected gain G(t) is limited to be within the range of the predetermined threshold value. In other words, the threshold value is set to be the maximum or minimum value, and the absolute value of the gain G(t) is limited not to exceed the threshold value. If the operation unit of the user is vibrated, therefore, a situation is suppressed in which the absolute value of the gain G(t) is too small to compensate for the delay or too large to prevent oscillation.

The processes of Steps S154 to S156 can be performed by a single reading process, if the gain G(t) has previously been mapped in the gain acquisition unit 831 to satisfy the conditions of the respective steps.

At Step S157, the multiplication unit 834 multiplies the displacement (x(t), y(t)) by the gain G(t). That is, the displacement is multiplied by the gain G(t) as a coefficient, and thereby the corrected displacement (x1(t), y1(t)) is generated. For example, if the gain G(t) is used as the representative value integrating the value in the X-axis direction and the value in the Y-axis direction, the corrected displacement (x1(t), y1(t)) is calculated with the following formula.

$$x1(t)=x(t)\cdot G(t)$$

$$y1(t)=y(t)\cdot G(t) \quad (10)$$

At Step S158, the output unit 827 outputs the corrected displacement (x1(t), y1(t)). That is, the larger the gain G(t) is, i.e., the larger the correction amount of the displacement is, the larger the compensation amount of the delay in response is. That is, as the gain G(t) is increased, the delay between the operation of the operation unit and the movement of the pointer 22 is reduced. If the value of the gain G(t) is further increased, the movement of the pointer 22 is more advanced in phase than the operation of the operation unit.

Further, the processes performed here include a process of removing a hand-shake component of the operation unit through a low-pass filter, and a process of, when the operation velocity is low (a low velocity and a low acceleration), setting an extremely low moving velocity of the pointer 22 to make it easy to stop the pointer 22 on the icon 21.

The above-described processes are repeatedly performed during the operation of the operation unit.

As described above, in this embodiment, the gain G(t) is determined in accordance with the displacement and the velocity.

Changes in Displacement

Figure 36:
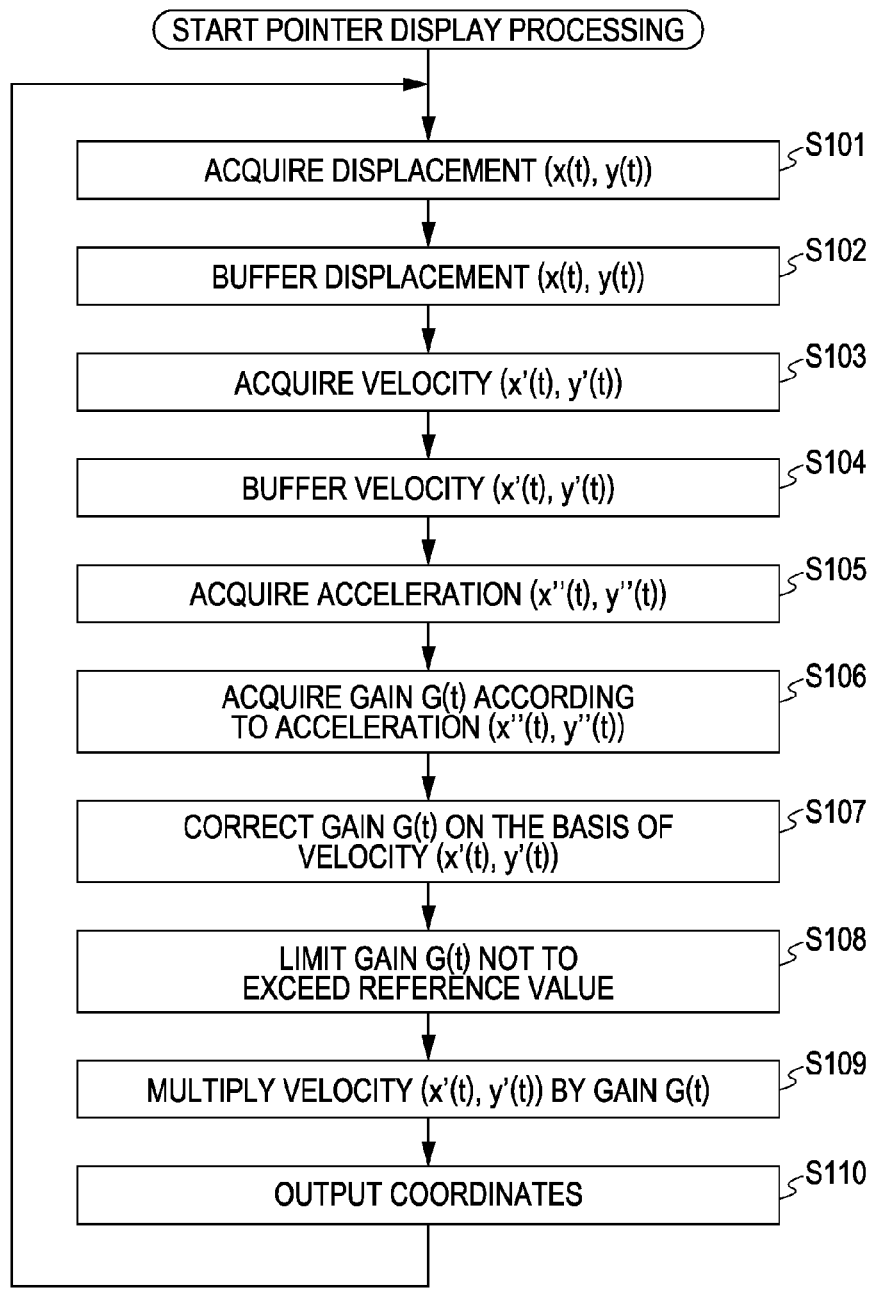
FIG. 36 is a flowchart explaining pointer display processing of a television receiver.

Subsequently, with reference to FIGS. 39A to 39C, description will be made of changes in displacement occurring when the delay of the operation signal is compensated for, as in the embodiments of FIGS. 36 and 38 described above.

Figure 39A:
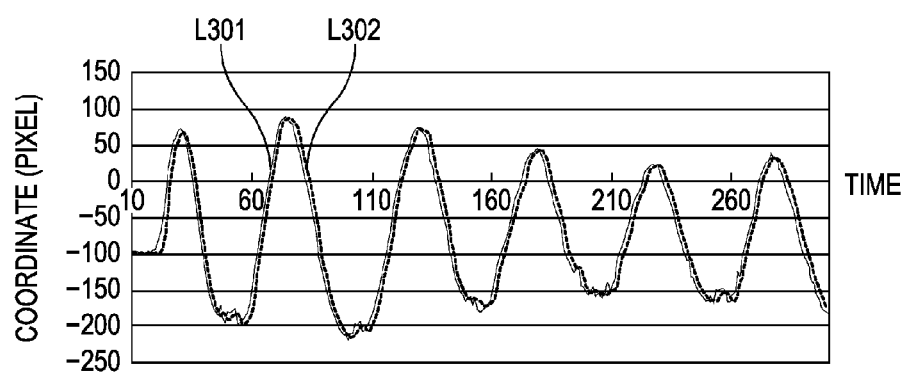
FIGS. 39A to 39C are diagrams illustrating changes in displacement.
Figure 39B:
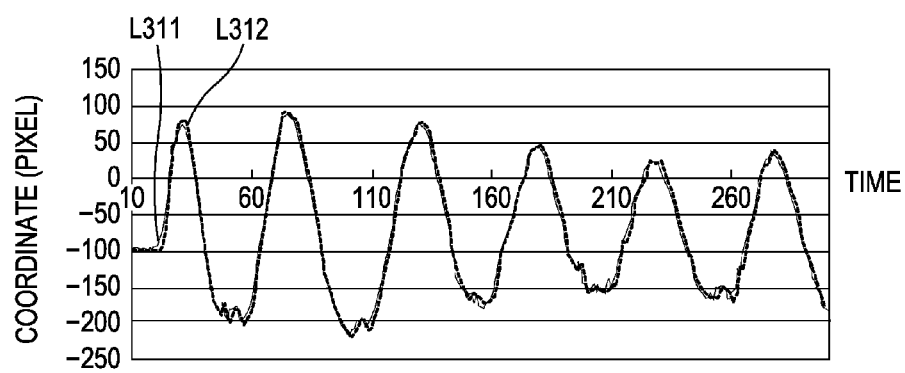
Figure 39C:
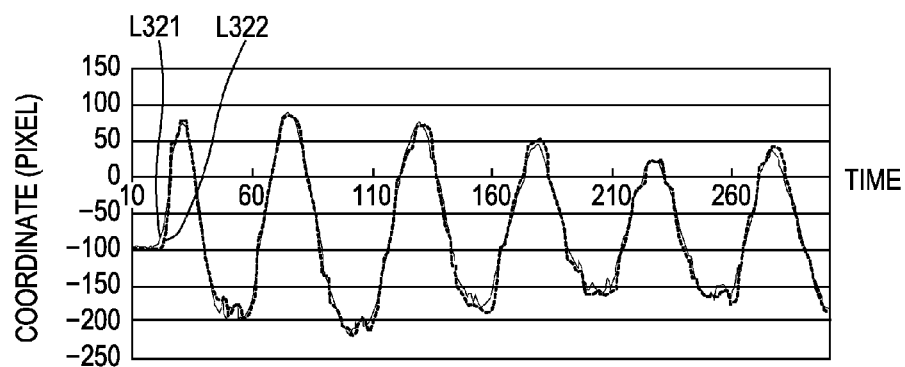

FIGS. 39A to 39C are diagrams illustrating the changes in displacement. The vertical axis represents the coordinate (pixel) as the displacement, and the horizontal axis represents the time. FIG. 39B illustrates the changes in displacement occurring in a case in which the delay of the velocity as the operation signal has been compensated for with the use of the gain G(t) defined on the basis of the velocity and the acceleration, as in the embodiment of FIG. 36. FIG. 39C illustrates the changes in displacement occurring in a case in which the delay of the displacement as the operation signal has been compensated for with the use of the gain G(t) defined on the basis of the displacement and the velocity, as in the embodiment of FIG. 38. Meanwhile, FIG. 39A illustrates the changes in displacement occurring in a case in which the compensation for the delay of the operation signal as in the embodiments of FIGS. 36 and 38 is not performed.

In FIG. 39A, a line L301 represents the displacement of the operation unit, and a line L302 represents the displacement of the pointer 22 occurring in a case in which the display of the pointer 22 is controlled on the basis of the detection result of the displacement of the operation unit. The delay of the operation signal with respect to the operation is not compensated for. Therefore, the line L302 is delayed in phase from the line L301.

In FIG. 39B, a line L311 represents the displacement of the operation unit, similarly to the line L301 of FIG. 39A. A line L312 represents the change in displacement occurring in the case in which the delay of the velocity as the operation signal has been compensated for with the use of the gain G(t) defined on the basis of the detection result of the velocity and the acceleration of the operation signal, as in the embodiment of FIG. 36. The delay of the operation signal with respect to the operation has been compensated for. Therefore, the line L312 is hardly delayed in phase with respect to the line L311, and thus is substantially the same in phase as the line L311.

In FIG. 39C, a line L321 represents the displacement of the operation unit, similarly to the line L301 of FIG. 39A. A line L322 represents the change in displacement occurring in the case in which the delay of the displacement as the operation signal has been compensated for with the use of the gain G(t) defined on the basis of the detection result of the displacement and the velocity of the operation signal, as in the embodiment of FIG. 38. The delay of the operation signal with respect to the operation has been compensated for. Therefore, the line L322 is hardly delayed in phase with respect to the line L321, and thus is substantially the same in phase as the line L321.

Modified Examples

In the above, the electronic device operated by the input device 31 is the television receiver 10. However, the present invention is also applicable to the control of a personal computer and other electronic devices.

Further, if the electronic device to be controlled is a mobile electronic device, such as a mobile phone and a PDA (Personal Digital Assistant), for example, the input device 31 can be configured separately from or integrally with the mobile electronic device. If the input device 31 is integrated with the mobile electronic device, the entire mobile electronic device is operated in a predetermined direction to perform an input operation.

The series of processes described above can be performed both by hardware and software. To have the series of processes performed by software, a program forming the software is installed from a program recording medium on a computer incorporated in special hardware or a general-purpose personal computer, for example, which can perform a variety of functions by installing a variety of programs thereon.

In the present specification, the steps of describing a program include not only processes performed chronologically in the described order but also processes not necessarily performed chronologically but performed concurrently or individually.

Further, in the present specification, a system refers to the entirety of a device formed by a plurality of devices.

The embodiments of the present invention are not limited to the embodiments described above. Thus, the present invention can be modified in a variety of ways within the scope not departing from the gist of the present invention.

The present application contains subject matter related to that disclosed in Japanese Priority Patent Application JP 2008-280764 filed in the Japan Patent Office on Oct. 31, 2008, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. An input device comprising:
a detection unit configured to detect an operation by a user for controlling an electronic device and to output an operation signal corresponding to the operation;
a first acquisition unit configured to:
acquire the operation signal; and
calculate a differential value of the operation signal, wherein the differential value of the operation signal is a difference between a first value of the operation signal acquired at a first time and a second value of the operation signal acquired at a second time, different from the first time;
a second acquisition unit configured to acquire a gain function defined by the calculated differential value to compensate for a delay in response of the operation signal with respect to the operation by the user; and
a compensation unit configured to scale the operation signal according to the acquired gain function, thereby compensating the operation signal for the delay in response of the operation signal with respect to the operation by the user.

2. The input device according to claim 1, wherein scaling the operation signal according to the acquired gain function comprises multiplying the operation signal by the acquired gain function.

3. The input device according to claim 1, wherein the gain function indicates a gain value as a function of time.

4. The input device according to claim 1, wherein the operation signal is indicative of an angular velocity of the input device.

5. The input device according to claim 4, wherein the differential value is indicative of an angular acceleration of the input device.

6. The input device according to claim 1, further comprising a storage unit configured to store at least the first value of the operation signal.

7. An input method, comprising:
detecting an operation by a user for controlling an electronic device and outputting an operation signal corresponding to the operation;
by a first acquisition unit:
acquiring the operation signal; and
calculating a differential value of the operation signal, wherein the differential value of the operation signal is a difference between a first value of the operation signal acquired at a first time and a second value of the operation signal acquired at a second time, different from the first time;
acquiring, by a second acquisition unit, a gain function defined by the calculated differential value to compensate for a delay in response of the operation signal with respect to the operation by the user; and
scaling the operating signal according to the acquired gain function, thereby compensating the operation signal for the delay in response of the operation signal with respect to the operation by the user.

* * * * *